(12) United States Patent
Oh

(10) Patent No.: US 9,699,770 B2
(45) Date of Patent: *Jul. 4, 2017

(54) MOBILE STATION APPARATUS AND BASE STATION APPARATUS

(71) Applicant: SHARP KABUSHIKI KAISHA, Osaka-shi, Osaka (JP)

(72) Inventor: Wahoh Oh, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 347 days.

This patent is subject to a terminal disclaimer.

(21) Appl. No.: 14/142,589

(22) Filed: Dec. 27, 2013

(65) Prior Publication Data
US 2014/0112298 A1    Apr. 24, 2014

Related U.S. Application Data

(60) Division of application No. 13/454,707, filed on Apr. 24, 2012, now Pat. No. 8,824,403, which is a
(Continued)

(30) Foreign Application Priority Data

Oct. 26, 2009 (JP) ................................. 2009-245493

(51) Int. Cl.
H04W 72/04    (2009.01)
H04L 5/00    (2006.01)

(52) U.S. Cl.
CPC ....... H04W 72/0413 (2013.01); H04L 5/0092 (2013.01); H04W 72/048 (2013.01); H04W 72/0453 (2013.01)

(58) Field of Classification Search
None
See application file for complete search history.

(56) References Cited

U.S. PATENT DOCUMENTS 6,907,250 B2    6/2005 Ishikawa et al.
7,961,700 B2    6/2011 Malladi et al.
(Continued)

FOREIGN PATENT DOCUMENTS

CN    101345988 A    1/2009
GB    2 437 130 A    10/2007
(Continued)

OTHER PUBLICATIONS

Huawei, "Carrier Aggregation in Active Mode", 3GPP TSG-RAN WG2 Meeting #66, San Francisco, Apr. 28, 2009, R2-093104, 4 pages, Mobile Competence Centre, 650, Route Des Lucioles; F-06921 Sopia-Antipolis Cedex, France.
(Continued)

Primary Examiner — Candal Elpenord
(74) Attorney, Agent, or Firm — Birch, Stewart, Kolasch & Birch, LLP

(57) ABSTRACT

An ASN encoder of a mobile station apparatus generates transmission and reception capability information including information relating to one or a plurality of component carriers to be used for communication with a base station apparatus. A transmission and reception apparatus transmits the transmission and reception capability information to the base station apparatus. A controller controls the communication with the base station apparatus, using the one or the plurality of component carriers assigned by the base station apparatus based on the transmission and reception capability information.

14 Claims, 32 Drawing Sheets

Related U.S. Application Data continuation of application No. PCT/JP2010/068474, filed on Oct. 20, 2010.

(56) References Cited

U.S. PATENT DOCUMENTS

| | | | |
|---|---|---|---|
| 8,311,060 B2 | 11/2012 | Chen et al. | |
| 8,489,105 B2 | 7/2013 | Choi | |
| 8,606,257 B2* | 12/2013 | Li | H04W 8/22 455/422.1 |
| 2006/0109865 A1* | 5/2006 | Park | H04W 16/02 370/482 |
| 2007/0117570 A1 | 5/2007 | Noh et al. | |
| 2007/0223611 A1 | 9/2007 | Ode et al. | |
| 2008/0075187 A1 | 3/2008 | Sutskover | |
| 2008/0159248 A1* | 7/2008 | Li | H04W 76/025 370/342 |
| 2008/0259863 A1* | 10/2008 | Zhang | H04L 5/0005 370/329 |
| 2009/0210766 A1 | 8/2009 | Katayama et al. | |
| 2009/0213806 A1 | 8/2009 | Ode | |
| 2010/0020757 A1 | 1/2010 | Walton et al. | |
| 2010/0040004 A1* | 2/2010 | Damnjanovic | H04L 5/0007 370/329 |
| 2010/0050034 A1 | 2/2010 | Che et al. | |
| 2010/0098012 A1* | 4/2010 | Bala | H04L 5/001 370/329 |
| 2010/0118720 A1 | 5/2010 | Gauvreau et al. | |
| 2010/0267394 A1 | 10/2010 | Wu | |
| 2010/0271970 A1 | 10/2010 | Pan et al. | |
| 2010/0303011 A1 | 12/2010 | Pan et al. | |
| 2011/0051711 A1 | 3/2011 | Kishiyama et al. | |
| 2011/0170499 A1* | 7/2011 | Nayeb Nazar | H04L 1/1812 370/329 |
| 2011/0205976 A1 | 8/2011 | Roessel et al. | |
| 2011/0211541 A1 | 9/2011 | Yuk et al. | |
| 2011/0267978 A1* | 11/2011 | Etemad | H04L 5/003 370/254 |
| 2012/0039298 A1 | 2/2012 | Lee et al. | |
| 2013/0201921 A1 | 8/2013 | Chen et al. | |

FOREIGN PATENT DOCUMENTS

| | | |
|---|---|---|
| WO | WO 2006/046307 A1 | 5/2006 |
| WO | WO 2008/056425 A1 | 5/2008 |
| WO | WO 2009/072956 A1 | 6/2009 |
| WO | WO 2009/119834 A1 | 10/2009 |
| WO | WO 2010/005233 A2 | 1/2010 |

OTHER PUBLICATIONS

Nokia, Nokia Siemens Networks, "Carrier Aggregation Configurations and DL/UL Linkage", 3GPP TSG RAN WG1 Meeting #58bis, Miyazaki, Japan, Oct. 12, 2009, R1-093902, 4 pages, Mobile Competence Centre, 650, Route Des Lucioles, F-06921 Sophia-Antipolis Cedex, France.
ZTE, "Downlink Control Structure for LTE-A", 3GPP TSG-RAN WG1 Meeting #56, Athens, Greece, Feb. 3, 2009, R1-090628, 5 pages, Mobile Competence Centre, 650, Route Des Lucioles, F-06921 Sophia-Antipolis Cedex, France.
3GPP TR36.814 V1.5.0(Nov. 2009), Further advancements for E-UTRA Physical layer aspects, http://www.3gpp.org/ftp/Specs/html-in_fo/36814.htm.
3GPP TR36.815 V0.4.0(Nov. 2009), LTE-Advanced feasibility studies in RAN WG4, http://www.3gpp.org/ftp/Specs/html-info/36815.htm.
3GPP TR36.913, V9.0.0 Requirements for Further Advancements for E-UTRA; Dec. 2009, pp. 1-15.
3GPP TS 36.101 V8.8.0 (Dec. 2009).
3GPP TS 36.101, V9.0.0, User Equipment (UE) radio transmission and reception; Jun. 2009, pp. 1-142.
3GPP TS 36.213 V9.0.1 (Dec. 2009).
3GPP TS 36.331 V8.8.0 (Dec. 2009).
Ericsson, "Scenarios and Assumptions for Carrier Aggregate in LTE Advanced", R4-090594, 3GPP TSG-RAN WG4 Meeting #50, Athens, Greece, Feb. 9-13, 2009, 4 pages.
Ericsson, Report of the email discussion [67#24] LTE: RRC Protocol extensions, 3GPP TSG RAN WG2 meeting #67bis R2-095759, Oct. 12, 2009, URL, ftp://ftp.3gpp.org/tsg_ran/WG2_RL2/TSGR2_67bis/Docs/R2-095759.zip.
LG Electronics, "Carrier aggregation and control signaling for LTE-A", R1-082946, 3GPP TSG-RAN WG1 Meeting #54bis, Jeju, Korea Aug. 18-22, 2008, 5 pages.
Motorola, "Text Proposed for LTE-A Spectrum Aggregation Scenarios and Their Impact on UE Architecture", R1-083828, 3GPP TSG-RAN WG1 Meeting #54bis, Prague, Czech Republic, Sep. 29-Oct. 3, 2008, pp. 1-11.
Nokia, "Study of UE architecture for LTE-A deployment scenarios", R4-091204, 3GPP TSG-RAN WG4 Meeting #50bis, Seoul, South Korea, Mar. 23-27, 2009, pp. 1-10.
NTT docomo, Inc.: "Update Views on Support of Wider Bandwidth in LTE-Advanced", R1-083015, 3GPP TSG-RAN WG1 Meeting #54, Jeju, Korea, Aug. 18-22, 2008, pp. 1-19.
NTT docomo, T-Mobile Intl., CMCC, Orange, Vodafone, Telecom Italia, "Prioritized Deployment Scenarios for LTE-Advanced studies", R4-091011, 3GPP TSG RAN WG4 Meeting #50, Athens, Greece, Feb. 9-13, 2009, 5 pages.
NTT Docomo: "Initial Access Procedure for Asymmetric Wider Bandwidth in LTE-Advanced", 3GPP TSG RAN WG1 Meeting #57bis, R1-092802, Jul. 2009, pp. 1-4.
Office Action dated Jan. 4, 2011, issued in Japanese Patent Application No. 2009-245493.
PCT/ISA/210—International Search Report dated Jan. 11, 2011, issued in PCT/JP2010/068474.
Reply to Written Opinion, issued in PCT/JP2010/068474.
U.S. Cellular Corporation, Alcatel-Lucent, RP-091211, 3GPP TSG RAN Meeting #46, Sanya, P.R. China, Dec. 1-4, 2009.
U.S. Notice of Allowance issued in U.S. Appl. No. 13/454,707 on Jul. 31, 2013.
U.S. Notice of Allowance issued in U.S. Appl. No. 13/454,707 on Sep. 30, 2013.
U.S. Notice of Allowance, dated Sep. 18, 2013, issued in U.S. Appl. No. 13/581,246.
U.S. Office Action issued in U.S. Appl. No. 13/454,707 on Apr. 10, 2013.
U.S. Office Action issued in U.S. Appl. No. 13/454,707 on Oct. 30, 2012.
U.S. Notice of Allowance issued in U.S. Appl. No. 13/454,707 on Jun. 4, 2014.
Panasonic, "Discussion on when UE starts aggregating carriers", 3GPP TSG RAN WG1 Meeting #55bis, R1-090261, Jan. 12-16, 2009 (published online Jan. 8, 2009), 2 pgs.
Nokia, LTE-A UE categories, 3GPP TSG-RAN WG4 Ad Hoc #1 R4-100069, 2010, Jan. 18-22, 2010, 4 pages, Sophia Antipolis, France.
U.S. Notice of Allowance issued in U.S. Appl. No. 13/581,246 on Jan. 10, 2014.
Huawei, "DL/UL Asymmetric Carrier aggregation", 3GPP Draft, R1-083706, 3rd Generation Partnership Project (3GPP), Mobile Competence Centre, 650, Route Des, Lucioles, F-06921 Sophia-Antipolis Cedex France, Prague, Czech Republic, Sep. 24, 2008, XP050317048, 4 pages.
LG Electronics, "UE-specific Carrier Assignment for LTE-Advanced", 3GPP Draft, R1-091207, 3rd Generation Partnership Project (3GPP), Mobile Competence Centre, 650, Route Des Lucioles, F-06921, Sophia-Antipolis, France, Seoul, Korea, Mar. 17, 2009, XP050338822, 3 pages.
Motorola, "Downlink UE Capability", 3GPP Draft, R1-060382, DL UECAP+TP, 3rd Generation Partnership Project (3GPP), Mobile Comptence Centre, 650, Route Des Lucioles, F-06921, Sophia-Antipolis Cedex, France, vol. Ran WG1, Denver, USA, Feb. 9, 2006, XP050101328, 6 pages.

(56) References Cited

OTHER PUBLICATIONS

3rd Generation Partnership Project; Technical Specification Group Radio Acess Network; Evolved Universal Terrestrial Radio Access (E-UTRA); Radio Resource Control (RRC); Protocol Specification (Release 8), TS36.331 V8.4.0 (Dec. 2008), 198 pgs.

3rd Generation Partnership Project; Technical Specification Group Radio Acess Network; Radio Resource Control (RRC); Protocol Specification (Release 8), TS25.331 V8.7.0 (Jun. 2009), 1,685 pgs.

Nokia Siemens Networks, "Missing details of semi-persistent scheduling", R1-083718, 3GPP TSG-RAN WG1 Meeting #54bis, Prague, Czech Republic, Sep. 29-Oct. 3, 2008, 2 pgs.

* cited by examiner

FIG. 5

| RADIO PARAMETER | EXPLANATION | ASSOCIATED CIRCUIT BLOCK | REMARKS |
|---|---|---|---|
| RF_BWm | FREQUENCY BAND NUMBER m=1, 2, ···, M | TRANSMISSION AND RECEPTION COMMON ANTENNA a101 ANTENNA DUPLEXER (DUP) a102 RADIO RECEIVER (RF_Rx) a11 QUADRATURE DEMODULATOR (IQ_DM) a12 QUADRATURE MODULATOR (IQ_MD) a15 RADIO TRANSMITTER (RF_Tx) a16 | SEE FIG. 6 |
| BB_BWn | BASEBAND FREQUENCY BANDWIDTH NUMBER n=1, 2, ···, N | QUADRATURE DEMODULATOR (IQ_DM) a12 BASEBAND DEMODULATOR (BB_DM) a13 BASEBAND MODULATOR (BB_MD) a14 QUADRATUER MODULATOR (IQ_MD) a15 | SEE FIG. 7 |

FIG. 6

| FREQUENCY BAND NUMBER RF_BWm (Operating Band) | Uplink(UL) operating band BS receive UE transmit $F_{UL\_low} - F_{UL\_high}$ | | | Downlink(DL) operating band BS transmit UE receive $F_{DL\_low} - F_{DL\_high}$ | | | FREQUENCY BANDWIDTH MHz | TRANSMISSION MODE |
|---|---|---|---|---|---|---|---|---|
| 1 | 1920MHz | – | 1980MHz | 2110MHz | – | 2170MHz | 60 | FDD |
| 2 | 1850MHz | – | 1910MHz | 1930MHz | – | 1990MHz | 60 | |
| 3 | 1710MHz | – | 1785MHz | 1805MHz | – | 1880MHz | 75 | |
| 4 | 1710MHz | – | 1755MHz | 2110MHz | – | 2155MHz | 45 | |
| 5 | 824MHz | – | 849MHz | 869MHz | – | 894MHz | 25 | |
| 6 | 830MHz | – | 840MHz | 875MHz | – | 885MHz | 10 | |
| 7 | 2500MHz | – | 2570MHz | 2620MHz | – | 2690MHz | 70 | |
| 8 | 880MHz | – | 915MHz | 925MHz | – | 960MHz | 35 | |
| 9 | 1749.9MHz | – | 1784.9MHz | 1844.9MHz | – | 1879.9MHz | 35 | |
| 10 | 1710MHz | – | 1770MHz | 2110MHz | – | 2170MHz | 60 | |
| 11 | 1427.9MHz | – | 1452.9MHz | 1475.9MHz | – | 1500.9MHz | 25 | |
| 12 | 698MHz | – | 716MHz | 728MHz | – | 746MHz | 18 | |
| 13 | 777MHz | – | 787MHz | 746MHz | – | 756MHz | 10 | |
| 14 | 788MHz | – | 798MHz | 758MHz | – | 768MHz | 10 | |
| ... | | | | | | | | |
| 17 | 704MHz | – | 716MHz | 734MHz | – | 746MHz | 12 | FDD |
| ... | | | | | | | | |
| 33 | 1900MHz | – | 1920MHz | 1900MHz | – | 1920MHz | 20 | TDD |
| 34 | 2010MHz | – | 2025MHz | 2010MHz | – | 2025MHz | 15 | |
| 35 | 1850MHz | – | 1910MHz | 1850MHz | – | 1910MHz | 60 | |
| 36 | 1930MHz | – | 1990MHz | 1930MHz | – | 1990MHz | 60 | |
| 37 | 1910MHz | – | 1930MHz | 1910MHz | – | 1930MHz | 20 | |
| 38 | 2570MHz | – | 2620MHz | 2570MHz | – | 2620MHz | 50 | |
| 39 | 1880MHz | – | 1920MHz | 1880MHz | – | 1920MHz | 40 | |
| 40 | 2300MHz | – | 2400MHz | 2300MHz | – | 2400MHz | 100 | |
| ... | ... | | ... | ... | | ... | | ... |
| A | 3410MHz | – | 3500MHz | 3510MHz | – | 3600MHz | 90 | FDD |
| B | 3410MHz | – | 3600MHz | 3410MHz | – | 3600MHz | 190 | TDD |
| C | 790MHz | – | 820MHz | 832MHz | – | 862MHz | 30 | FDD |
| ... | ... | | ... | ... | | ... | | ... |
| 64 | ... | | ... | ... | | ... | | ... |

FIG. 7

| BASEBAND FREQUENCY BANDWIDTH NUMBER BB_BWn | FREQUENCY BANDWIDTH MHz |
|---|---|
| 1 | 20 |
| 2 | 40 |
| 3 | 60 |
| 4 | 80 |
| 5 | 100 |
| 6 | 30 (15x2) |
| 7 | 45 (15x3) |
| ... | ... |
| 64 | ... |

FIG. 11

| RADIO PARAMETER | | EXPLANATION OF RADIO PARAMETER | REMARKS |
|---|---|---|---|
| RXi | | i-th RF RECEPTION BRANCH NUMBER (i-th RADIO RECEIVER RF_Rxi) | RADIO RECEIVER COMPATIBLE WITH DIFFERENT RECEPTION ANTENNAS AND FREQUENCY BANDS, i=1, 2, ..., I, I IS THE MAXIMUM NUMBER OF RECEPTION ANTENNAS, I=8 IN CASE OF 8x8 MIMO. |
| RXi | RF_BWm | FERQUENCY BAND NUMBER | NUMBER m (m=1, 2, ..., M) OF FREQUENCY BAND FOR i-th RF RECEPTION BRANCH TO PERFORM RECEPTION, COMPATIBLE WITH MULTIPLE FREQUENCY NUMBERS |
| | BB_DMl | NUMBER ALLOCATED TO i-th BB DEMODULATION BRANCH CONNECTED TO i-th RF RECEPTION BRANCH | l=1, 2, ..., L |
| | BB_DMl BB_BWn | NUMBER ALLOCATED TO BASEBAND FREQUENCY BANDWIDTH OF l-th BB DEMODULATION BRANCH | INDEX n=1, 2, ..., N OF THE MAXIMUM FREQUENCY BANDWIDTH FOR BASEBAND PROCESS |
| TXj | | j-th RF TRANSMISSION BRANCH NUMBER (j-th RADIO TRANSMITTER RF_Txk) | RADIO TRANSMITTER COMPATIBLE WITH DIFFERENT TRANSMISSION ANTENNAS AND FREQUENCY BANDS, j=1, 2, ..., J, J IS THE MAXIMUM NUMBER OF TRANSMISSION ANTENNAS, J=4 IN CASE OF 4x4 MIMO. |
| TXj | RF_BWm | FREQUENCY BAND NUMBER | NUMBER m (m=1, 2, ..., M) ALLOCATED TO FREQUENCY BAND FOR j-th RF TRANSMISSION BRANCH TO PERFORM TRANSMISSION, COMPATIBLE WITH MULTIPLE FREQUENCY NUMBERS |
| | BB_MDk | NUMBER ALLOCATED TO k-th BB MODULATION BRANCH CONNECTED TO j-th RF TRANSMISSION BRANCH | k=1, 2, ..., K |
| | BB_MDk BB_BWn | NUMEBR ALLOCATED TO BASEBAND FREQUENCY BANDWIDTH OF k-th BB DEMODULATION BRANCH | INDEX n=1, 2, ..., N OF MAXIMUM FREQUENCY BANDWIDTH FOR BASEBAND PROCESS |

FIG. 12

```
-- ASN1START
Max-RFRx-Branchs     INTEGER ::=8      --MAXIMUM NUMBER OF RF RECEPTION BRANCHES(I=8)
Max-BBRx-Branchs     INTEGER ::=5      --MAXIMUM NUMBER OF BB DEMODULATION BRANCHES(L=5)
Max-RFTx-Branchs     INTEGER ::=4      --MAXIMUM NUMBER OF RF TRANSMISSION BRANCHES(J=4)
Max-TxBB-Branchs     INTEGER ::=5      --MAXIMUM NUMBER OF BB MODULATION BRANCHES(K=5)
Max-RF-Bands         INTEGER ::=64     --MAXIMUM FREQUENCY BAND NUMBER(M=64)
Max-BBRX-Bands       INTEGER ::=64     --MAXIMUM BAND NUMBER OF BB DEMODULATION BRANCH(N=64)

--LTE-A MOBILE STATION APPARATUS CAPABILITY MESSAGE
UE-AdvancedEUTRA-Capability ::= SEQUENCE {
   ue-rf-capability UE-RF-Capability    --LTE-A MOBILE STATION APPARATUS CONFIGURATION
}
--LTE-A MOBILE STATION APPARATUS CONFIGURATION MESSAGE
UE-RF-Capability ::= SEQUENCE {
   ue-rx-capability UE-Rx-Capability    --CONFIGURATION OF RECEIVER OF MOBILE STATION APPARATUS
   ue-tx-capability UE-Tx-Capability    --CONFIGURATION OF TRANSMITTER OF MOBILE STATION APPARATUS
}
--RECEIVER CONFIGURATION MESSAGE OF MOBILE STATION APPARATUS
UE-Rx-Capability ::= SEQUENCE {
  ue-rfrx-branchs  UE-RFRx-Branchs
}
UE-RFRx-Branchs ::= SEQUENCE (SIZE (1..Max-RFRx-Branchs)) OF UE-RFRX-Branch  --i-th RF RECEPTION BRANCH
UE-RFRX-Branch ::=   SEQUENCE {
  ue-bbrx-branchs UE-BBRx-Branchs --BB DEMODULATION BRANCH ASSOCIATED WITH i-th RF RECEPTION BRANCH
  ue-rfrx-band-list UE-RFRx-Band-List   --FREQUENCY BAND NUMBER ASSOCIATED WITH i-th RF RECEPTION BRANCH
}
UE-BBRx-Branchs ::= SEQUENCE (SIZE (1..Max-BBRx-Branchs)) OF UE-BBRX-Branch  --l-th BB DEMODULATION BRANCH
UE-BBRX-Branch ::=   SEQUENCE {
  ue-bbrx-band-list UE-BBRx-Band-List
}
UE-RFRx-Band-List ::=SEQUENCE (SIZE (1..Max-RF-Bands)) OF UE-RFRx-Band
UE-RFRx-Band ::=    SEQUENCE {
   ue-rfrx-band     INTEGER (1..Max-RF-Bands),--FREQUENCY BAND NUMBER RF_BWm ASSOCIATED WITH i-th RF RECEPTION BRANCH
}
UE-RxBB-Band-List ::=SEQUENCE (SIZE (1..Max-BB-Bands)) OF UE-RxBB-Band
UE-RxBB-Band ::=    SEQUENCE {
  ue-rxbb-band    INTEGER (1..Max-BB-Bands),--BB FREQUENCY BANDWIDTH NUMBER BB_BWn ASSOCIATED WITH l-th BB DEMODULATION BRANCH
}
--TRANSMITTER CONFIGURATION MESSAGE OF MOBILE STATION APPARATUS
UE-Tx-Capability ::= SEQUENCE {
  ue-rftx-branchs UE-RFTx-Branchs
}
UE-RFTx-Branchs ::=  SEQUENCE (SIZE (1..Max-RFTx-Branchs)) OF UE-RFTX-Branch  --j-th RF TRANSMISSION BRANCH
UE-RFTX-Branch ::=   SEQUENCE {
  ue-bbtx-branchs UE-BBTx-Branchs     --BB MODULATION BRANCH ASSOCIATED WITH j-th RF TRANSMISSION BRANCH
  ue-rftx-band-list UE-RFTx-Band-List   --FREQUENCY BAND NUMBER ASSOCIATED WITH j-th RF TRANSMISSION BRANCH
}
UE-BBTx-Branchs ::=   SEQUENCE (SIZE (1..Max-BBTx-Branchs)) OF UE-BBTX-Branch  --k-th BB MODULATION BRANCH
UE-BBTX-Branch ::=   SEQUENCE {
  ue-bbtx-band-list UE-BBTx-Band-List
}
UE-RFTx-Band-List ::=SEQUENCE (SIZE (1..Max-RF-Bands)) OF UE-RFTx-Band
UE-RFTx-Band ::=     SEQUENCE {
  ue-rftx-band    INTEGER (1..Max-RF-Bands),--FREQUENCY BAND NUMBER RF_BWm ASSOCIATED WITH j-th RF TRANSMISSION BRANCH
}
UE-TxBB-Band-List ::=SEQUENCE (SIZE (1..Max-BB-Bands)) OF UE-TxBB-Band
UE-TxBB-Band ::=     SEQUENCE {
  ue-txbb-band    INTEGER (1..Max-BB-Bands),--BB FREQUENCY BANDWIDTH NUMBER BB_BWn ASSOCIATED WITH k-th BB MODULATION BRANCH
}
-- ASN1STOP
```

FIG. 13

```
-- ASN1START
UE-EUTRA-Capability ::=    SEQUENCE {
    ue-Category            INTEGER (1..11),    --LTE MOBILE STATION CATEGORY
    ......
    },
    nonCriticalExtension   SEQUENCE {
    ue-rf-capability       UE-RF-Capability --TRANSMISSION AND RECEPTION DEVICE CONFIGURATION INFORMATION --LTE MOBILE STATION CATEGORY AND LTE-A MOBILE STATION CATEGORY
    },
}
-- ASN1STOP
```

FIG. 14

| RADIO PARAMETER | | | EXPLANATION OF RADIO PARAMETER | REMARKS |
|---|---|---|---|---|
| RX1 | | | 1st RF RECEPTION BRANCH | CONFIGURATION SUCH THAT RECEPTION ANTENNA 1, DUP1, RADIO RECEIVER RF_Rx1, AND BB DEMODULATION BRANCHES 1,2 |
| RX1 | RF_BW1 | | FREQUENCY BAND NUMBER 1 | DOWNLINK 2110 MHz TO 2170 MHz |
| | BB_DM1 | | NUMBER 1 ALLOCATED TO 1st BB DEMODULATION BRANCH CONNECTED TO 1st RF RECEPTION BRANCH | CONFIGURATION SUCH THAT QUADRATURE DEMODULATOR IQ_DM1 AND BASEBAND DEMODULATOR BB_DM1 |
| | BB_DM1 | BB_BW3 | NUMBER 3 ALLOCATED TO BASEBAND FERQUENCY BANDWIDTH OF 1st BB DEMODULATION BRANCH | MAXIMUM FREQUENCY BANDWIDTH 60 MHz FOR BASEBAND PROCESS |
| | BB_DM2 | | NUMBER 2 ALLOCATED TO 2nd BB DEMODULATION BRANCH CONENCTED TO 1st RF RECEPTION BRANCH | CONFIGURATION SUCH THAT QUADRATURE DEMODULATOR IQ_DM2 AND BASEBAND DEMODULATOR BB_DM2 |
| | BB_DM2 | BB_BW1 | NUMBER 1 ALLOCATED TO BASEBAND FERQUENCY BANDWIDTH OF 2nd BB DEMODULATION BRANCH | MAXIMUM FREQUENCY BANDWIDTH 20 MHz FOR BASEBAND PROCESS |
| TX1 | | | 1st RF TRANSMISSION BRANCH | CONFIGURATION SUCH THAT TRANSMISSION ANTENNA 1, DUP1, RADIO TRANSMITTER RF_Tx1, AND BB MODULATION BRANCH 1 |
| TX1 | RF_BW1 | | FREQUENCY BAND NUMBER 1 | UPLINK 1920 MHz TO 1980 MHz |
| | BB_MD1 | | NUMBER 1 ALLOCATED TO 1st BB MODULATION BRANCH CONNECTED TO 1st RF TRANSMISSION BRANCH | CONFIGURATION SUCH THAT QUADRATURE MODULATOR IQ_MD1 AND BASEBAND MODULATOR BB_MD1 |
| | BB_MD1 | BB_BW1 | NUMBER 1 ALLOCATED TO BASEBAND FERQUENCY BANDWIDTH OF 1st BB DEMODULATION BRANCH | MAXIMUM FREQUENCY BANDWIDTH 20 MHz FOR BASEBAND PROCESS |

FIG. 16

| Category | | Category1 | Category2 | Category3 | Category4 | Category5 |
|---|---|---|---|---|---|---|
| Bit rate | DL | 10Mbps | 50Mbps | 100Mbps | 150Mbps | 300Mbps |
| | UL | 5Mbps | 25Mbps | 50Mbps | 50Mbps | 75Mbps |
| Modulation scheme | DL | | | QPSK, 16QAM, 64QAM | | |
| | UL | | QPSK, 16QAM | | | QPSK, 16QAM, 64QAM |
| Number of MIMO streams | DL | 1 | 2 | 2 | 2 | 4 |

FIG. 17

| RADIO PARAMETER | | | EXPLANATION OF RADIO PARAMETER | REMARKS |
|---|---|---|---|---|
| RXi | | | NUMBER ALLOCATED TO i-th RF RECEPTION BRANCH | i=1,2,3,4 |
| RXi | RF_BWm | | FREQUENCY BAND NUMBER | TABLE 2 |
| | BB_DMl | | NUMBER ALLOCATED TO l-th BB DEMODULATION BRANCH CONNECTED TO i-th RF RECEPTION BRANCH | l=1 (FIXED) |
| | BB_DMl | BB_BWn | NUMBER 1 ALLOCATED TO BASEBAND FREQUENCY BANDWIDTH OF l-th BB DEMODULATION BRANCH | n=1 (FIXED) |
| TXj | | | NUMBER ALLOCATED TO j-th RF TRANSMISSION BRANCH | j=1 (FIXED, THERE IS OPTION OF SWITCHING TWO TRANSMISSION ANTENNAS) |
| TXj | RF_BWm | | FREQUENCY BAND NUMBER | TABLE 2 |
| | BB_MDk | | NUMBER ALLOCATED TO k-th BB MODULATION BRANCH CONNECTED TO j-th RF TRANSMISSION BRANCH | k=1 (FIXED) |
| | BB_MDk | BB_BWn | NUMEBR ALLOCATED TO BASEBAND FREQUENCY BANDWIDTH OF k-th BB DEMODULATION BRANCH | n=1 (FIXED) |

FIG. 18

| Category | Category A (LTE Category 1) | Category B | Category C | Category D | Category E | Category F |
|---|---|---|---|---|---|---|
| Bit rate DL | 10Mbps | 100Mbps | 300Mbps | 500Mbps | 750Mbps | 1000Mbps |
| Bit rate UL | 5Mbps | 75Mbps | 200Mbps | 300Mbps | 400Mbps | 500Mbps |
| DL Number of MIMO streams | 2,1 | 4,2,1,1,1,1 | 4,2,1,1 | 4,4,2,2 | 8,4,4,2 | 8,8,4,4 |
| DL Number of CC (20MHz) | 1,1 | 1,1,2,3,4,5 | 1,2,4,5 | 2,3,4,5 | 2,3,4,5 | 2,3,4,5 |
| UL Number of MIMO streams | 2,1 | 4,2,1,1 | 4,2 | 4,2 | 4 | 4 |
| UL Number of CC (20MHz) | 1,1 | 1,1,1,2, | 1,2 | 1,2 | 2 | 2 |

FIG. 19

| | Category | Category A (LTE Category 1) | Category B | Category C | Category D | Category E | Category F |
|---|---|---|---|---|---|---|---|
| Bit rate | DL | 10Mbps | 100Mbps | 300Mbps | 500Mbps | 750Mbps | 1000Mbps |
| | UL | 5Mbps | 75Mbps | 200Mbps | 300Mbps | 400Mbps | 500Mbps |
| DL | Number of DATA streams | 2, 1 | 4, 2, 1, 1, 1, 1 | 4, 2, 1, 1 | 4, 4, 2, 2 | 8, 4, 4, 2 | 8, 8, 4, 4 |
| | Number of CC (20MHz) | 1, 1 | 1, 1, 2, 3, 4, 5 | 1, 2, 4, 5 | 2, 3, 4, 5 | 2, 3, 4, 5 | 2, 3, 4, 5 |
| UL | Number of DATA streams | 2, 1 | 4, 2, 1, 1 | 4, 2 | 4, 2 | 4 | 4 |
| | Number of CC (20MHz) | 1, 1 | 1, 1, 1, 2, | 1, 2 | 1, 2 | 2 | 2 |

FIG. 20

| | Category | Category A (LTE Category 1) | Category B | Category C | Category D | Category E | Category F |
|---|---|---|---|---|---|---|---|
| Bit rate | DL | 10Mbps | 100Mbps | 300Mbps | 500Mbps | 750Mbps | 1000Mbps |
| | UL | 5Mbps | 75Mbps | 200Mbps | 300Mbps | 400Mbps | 500Mbps |
| DL | Number of DATA streams | 2 | 4, 2 | 4, 2 | 4, 4, 2, 2 | 8, 4, 4, 2 | 8, 8, 4, 4 |
| | Number of CC (20MHz) | 1 | 1, 1 | 1, 2 | 2, 3, 4, 5 | 2, 3, 4, 5 | 2, 3, 4, 5 |
| UL | Number of DATA streams | 2 | 4, 2 | 4, 2 | 4, 2 | 4 | 4 |
| | Number of CC (20MHz) | 1 | 1, 1 | 1, 2 | 1, 2 | 2 | 2 |

FIG. 21

| | Category | Category A (LTE Category 1) | Category B | Category C | Category D | Category E | Category F |
|---|---|---|---|---|---|---|---|
| Bit rate | DL | 10Mbps | 100Mbps | 300Mbps | 500Mbps | 750Mbps | 1000Mbps |
| | UL | 5Mbps | 75Mbps | 200Mbps | 300Mbps | 400Mbps | 500Mbps |
| DL | Number of DATA streams | 2 | 4, 2 | 4, 2 | 4, 4, 2 | 8, 4, 4 | 8, 8, 4 |
| | Number of CC (20MHz) | 1 | 1, 1 | 1, 2 | 2, 3, 4 | 2, 3, 4 | 2, 3, 4 |
| UL | Number of DATA streams | 2 | 4, 2 | 4, 2 | 4, 2 | 4 | 4 |
| | Number of CC (20MHz) | 1 | 1, 1 | 1, 2 | 1, 2 | 2 | 2 |

FIG. 22

| Category | | Category A (LTE Category 1) | Category C | Category D | Category F |
|---|---|---|---|---|---|
| Bit rate | DL | 10Mbps | 300Mbps | 500Mbps | 1000Mbps |
| | UL | 5Mbps | 200Mbps | 300Mbps | 500Mbps |
| DL | Number of DATA streams | 2 | 4 | 4 | 4 |
| | Number of CC(20MHz) | 1 | 1 | 2 | 4 |
| UL | Number of DATA streams | 2 | 4 | 4 | 4 |
| | Number of CC(20MHz) | 1 | 1 | 1 | 2 |

FIG. 24

```
-- ASN1START
UE-AdvancedEUTRA-Capability ::=   SEQUENCE {
    ue-Category                   INTEGER (1..6),   --LTE-A MOBILE STATION CATEGORY
    ......
    },
    ......
}
-- ASN1STOP
```

FIG. 25

```
-- ASN1START
UE-EUTRA-Capability ::=   SEQUENCE {
  ue-Category             INTEGER (1..11),   --LTE MOBILE STATION CATEGORY
AND LTE-A MOBILE STATION CATEGORY
    ......
    },
    ......
}
-- ASN1STOP
```

FIG. 27

```
-- ASN1START
UE-AdvancedEUTRA-Capability ::=    SEQUENCE {
    ue-Category         INTEGER (1..6),    --LTE-A MOBILE STATION CATEGORY
    ue-rf-capabilityUE-RF-Capability  --TRANSMISSION AND RECEPTION CONFIGURATION INFORMATION
    ......
    },
    ......
}
-- ASN1STOP
```

FIG. 28

| RADIO PARAMETER | | | EXPLANATION OF RADIO PARAMETER | REMARKS |
|---|---|---|---|---|
| RX1 | | | 1st RF RECEPTION BRANCH | CONFIGURATION SUCH THAT RECEPTION ANTENNA 1, DUP1, RADIO RECEIVER RF_Rx1, AND BB DEMODULATION BRANCH 1 |
| RX1 | RF_BW1 | | FERQUENCY BAND NUMBER 1 | DOWNLINK 2110 MHz TO 2170 MHz |
| | BB_DM1 | | NUMBER 1 ALLOCATED TO 1st BB DEMODULATION BRANCH CONNECTED TO 1st RF RECEPTION BRANCH | CONFIGURATION SUCH THAT QUADRATURE DEMODULATOR IQ_DM1 AND BASEBAND DEMODULATOR BB_DM1 |
| | BB_DM1 | BB_BW3 | NUMBER 3 ALLOCATED TO BASEBAND FREQUENCY BANDWIDTH OF 1st BB DEMODULATION BRANCH | MAXIMUM FREQUENCY BANDWIDTH 60 MHz FOR BASEBAND PROCESS |
| RX2 | | | 2nd RF RECEPTION BRANCH | CONFIGURATION SUCH THAT RECEPTION ANTENNA 2, DUP2, RADIO RECEIVER RF_Rx2, AND BB DEMODULATION BRANCH 2 |
| | RF_BWA | | FREQUENCY BAND NUMBER A | DOWNLINK 3510 MHz TO 3600 MHz |
| | BB_DM2 | | NUMEBR 2 ALLOCATED TO 2nd BB DEMODULATION BRANCH CONENCTED TO 1st RF RECEPTION BRANCH | CONFIGURATION SUCH THAT QUADRATURE DEMODULATOR IQ_DM2 AND BASEBAND DEMODULATOR BB_DM |
| | BB_DM2 | BB_BW1 | NUMEBR 1 ALLOCATED TO BASEBAND FREQUENCY BANDWIDTH OF 2nd BB DEMODULATION BRANCH | MAXIMUM FREQUENCY BANDWIDTH 20 MHz FOR BASEBAND PROCESS |
| TX1 | RF_BW1 | | FREQUENCY BAND NUMBER 1 | COMPATIBLE WITH UPLINK 1920 MHz TO 1980 MHz |
| | BB_MD1 | | NUMBER 1 ALLOCATED TO 1st BB MODULATION BRANCH CONENCTED TO 1st RF TRANSMISSION BRANCH | CONFIGURATION SUCH THAT QUADRATURE MODULATOR IQ_MD1 AND BASEBAND MODULATOR BB_MD1 |
| | BB_MD1 | BB_BW1 | NUMBER 1 ALLOCATED TO BASEBAND FREQUENCY BANDWIDTH OF 1st BB DEMODULATION BRANCH | MAXIMUM FREQUENCY BANDWIDTH 20 MHz FOR BASEBAND PROCESS |

FIG. 29

| RADIO PARAMETER | | | EXPLANATION OF RADIO PARAMETER | REMARKS |
|---|---|---|---|---|
| RX1 | | | 1st RF RECEPTION BRANCH | CONFIGURATION SUCH THAT RECEPTION ANTENNA 1, DUP1, RADIO RECEIVER RF_Rx1, AND BB DEMODULATION BRANCH 1 |
| RX1 | RF_BW1 | | FREQUENCY BAND NUMBER 1 | DOWNLINK 2110 MHz TO 2170 MHz |
| | BB_DM1 | | NUMBER 1 ALLOCATED TO 1st BB DEMODULATION BRANCH CONNECTED TO 1st RF RECEPTION BRANCH | CONFIGURATION SUCH THAT QUADRATURE DEMODULATOR IQ_DM1 AND BASEBAND DEMODULATOR BB_DM1 |
| | BB_DM1 | BB_BW1 | NUMBER 1 ALLOCATED TO BASEBAND FREQUENCY BANDWIDTH OF 1st BB DEMODULATION BRANCH | MAXIMUM FREQUENCY BANDWIDTH 20 MHz FOR BASEBAND PROCESS |
| RX2 | | | 2nd RF RECEPTION BRANCH | CONFIGURATION SUCH THAT RECEPTION ANTENNA 2, DUP2, RADIO RECEIVER RF_Rx2, AND BB DEMODULATION BRANCH 2 |
| | RF_BWA | | FREQUENCY BAND NUMBER A | DOWNLINK 3510 MHz TO 3600 MHz |
| | BB_DM2 | | NUMBER 2 ALLOCATED TO 2nd BB DEMODULATION BRANCH CONNECTED TO 1st RF RECEPTION BRANCH | CONFIGURATION SUCH THAT QUADRATURE DEMODULATOR IQ_DM2 AND BASEBAND DEMODULATOR BB_DM |
| | BB_DM2 | BB_BW1 | NUMBER 1 ALLOCATED TO BASEBAND FREQUENCY BANDWIDTH OF 2nd BB DEMODUALTION BRANCH | MAXIMUM FREQUENCY BANDWIDTH 20 MHz FOR BASEBAND PROCESS |
| TX1 | | | 1st RF TRANSMISSION BRANCH | CONFIGURATION SUCH THAT TRANSMISSION ANTENNA 1, DUP1, RADIO TRANSMITTER RF_Tx1, AND BB MODULATION BRANCH 1 |
| TX1 | RF_BW1 | | FREQUENCY BAND NUMBER 1 | COMPATIBLE WITH UPLINK 1920 MHz TO 1980 MHz |
| | BB_MD1 | | NUMBER 1 ALLOCATED TO 1st BB MODULATION BRANCH CONENCTED TO 1st RF TRANSMISSION BRANCH | CONFIGURATION SUCH THAT QUADRATURE MODULATOR IQ_MD1 AND BASEBAND MODULATOR BB_MD1 |
| | BB_MD1 | BB_BW1 | NUMBER 1 ALLOCATED TO BASEBAND FREQUENCY BANDWIDTH OF 1st BB DEMODULATION BRANCH | MAXIMUM FREQUENCY BANDWIDTH 20 MHz FOR BASEBAND PROCESS |

FIG. 30

| UE_TRXh | Number of MIMO streams | Number of CC(20MHz) |
|---|---|---|
| 1 | 8 | 3 |
| 2 | 8 | 2 |
| 3 | 4 | 5 |
| 4 | 4 | 4 |
| 5 | 4 | 3 |
| 6 | 4 | 2 |
| 7 | 4 | 1 |
| 8 | 2 | 5 |
| 9 | 2 | 4 |
| 10 | 2 | 2 |
| 11 | 2 | 1 |
| 12 | 1 | 5 |
| 13 | 1 | 4 |
| 14 | 1 | 3 |
| 15 | 1 | 2 |
| 16 | 1 | 1 |

FIG. 32

```
-- ASN1START
UE-AdvancedEUTRA-Capability ::=  SEQUENCE {
  ue-Category INTEGER (1..6),--LTE-A MOBILE STATION CATEGORY
  ue-nrf-capability UE-NRF-Capability --ABBREVIATED TRANSMISSION AND RECEPTION APPARATUS CONFIGURATION INFORMATION
    ......
   },
    ......
}
UE-NRF-Capability ::= SEQUENCE {
  ue-nrx-capability   INTEGER (1..16),  --RECEPTION APPARATUS CONFIGURATION NUMBER
  ue-ntx-capability   INTEGER (1..16),  --TRANSMISSION APPARATUS CONFIGURATION NUMBER
}
-- ASN1STOP
```

FIG. 33

```
-- ASN1START
UE-EUTRA-Capability ::= EQUENCE {
   ue-Category INTEGER (1..11),  --LTE MOBILE STATION CATEGORY/LTE-A MOBILE STATION CATEGORY
    ......
   },
  nonCriticalExtension SEQUENCE {
  ue-nrf-capability UE-RF-Capability  --ABBREVIATED TRANSMISSION AND RECEPTION APPARATUS CONFIGURATION INFORMATION
}, }
UE-NRF-Capability ::= SEQUENCE {
  ue-nrx-capability   INTEGER (1..16),  --RECEPTION APPARATUS CONFIGURATION NUMBER
  ue-ntx-capability   INTEGER (1..16),  --TRANSMISSION APPARATUS CONFIGURATION NUMBER
}
-- ASN1STOP
```

MOBILE STATION APPARATUS AND BASE STATION APPARATUS

This application is a Divisional of co-pending application Ser. No. 13/454,707 filed on Apr. 24, 2012. Application Ser. No. 13/454,707 is a Continuation of PCT International Application No. PCT/JP2010/068474 filed on Oct. 20, 2010, which claims priority of Application No. 2009-245493 filed in Japan on Oct. 26, 2009, all of which are hereby expressly incorporated by reference into the present application.

TECHNICAL FIELD

The present invention relates to a mobile station apparatus and a base station apparatus.

BACKGROUND ART

3GPP (3rd Generation Partnership Project) is a standardization project that considers and generates specifications of cellular mobile communication systems based on networks advanced from GSM (Global System for Mobile Communications) and W-CDMA (Wideband-Code Division Multiple Access). The W-CDMA has been standardized by the 3GPP as a third generation cellular mobile communication method, and services thereof have been provided sequentially. Additionally, HSPA (High-Speed Packet Access) with the higher communication speed has also been standardized, and services thereof have been provided. EUTRA (Evolved Universal Terrestrial Radio Access), which is an evolved version of the third generation radio access technology, has been considered by the 3GPP, and the Release 8 specification has been completed at the end of 2008. Further, consideration of Advanced EUTRA (also referred to as LTE-Advanced or LTE-A), which is an advanced version of the EUTRA is in progress (Non-Patent Document 1).

For the LTE-A, carrier aggregation (hereinafter referred to as CA) technology has been proposed as data transmission technology which maintains the compatibility with the EUTRA and achieves the speed that is equal to or greater than that of IMT-Advanced (4G) (for example, Non-Patent Document 2). The CA technology is such technology that a mobile station apparatus simultaneously receives signals transmitted from a base station apparatus, using continuous or non-continuous downlink component carriers (hereinafter referred to as CC) each having a small frequency bandwidth (for example, 20 MHz bandwidth), and generates a pseudo carrier signal having a large frequency bandwidth (for example, 100 MHz bandwidth of five CCs), thereby achieving high-speed downlink data transmission. Similarly, according to the CA technology, the base station apparatus simultaneously receives CC signals transmitted from the mobile station apparatus, using continuous or non-continuous uplink component carriers each having a small frequency bandwidth (for example, 20 MHz bandwidth), and generates a pseudo carrier signal having a large frequency bandwidth (for example, 40 MHz bandwidth of two CCs), thereby achieving high-speed uplink data transmission.

(Relationship Between Introduction of CA Technology and Combination of Mobile Station Apparatus Configuration)

A combination of CCs for the CA technology depends on various parameters, such as the total number of uplink CCs (for example, two), the total number of downlink CCs (for example, five), the number of frequency bands (for example, three frequency bands, which are 700 MHz band, 2 GHz band, and 3 GHz band), continuous or non-continuous CCs, transmission modes (for example, FDD, TDD), and the like.

FIG. 34 is a schematic diagram illustrating an aggregation of CCs according to related art. In FIG. 34, a horizontal axis denotes frequency. Additionally, FIG. 34 shows a case where there are two frequency bands, which are a frequency band 1 (2 GHz band) and a frequency band 2 (3 GHz band). Further, FIG. 34 shows cases 1 to 6 separated in the vertical direction. The cases 1 to 3 show cases of a FDD (Frequency Division Duplex) transmission mode. The cases 4 to 6 show cases of a TDD (Time Division Duplex) transmission mode.

In FIG. 34, the case 1 shows an aggregation of CCs where three continuous CCs (center frequencies f1_R1, f1_R2, and f1_R3) are selected in a band 12 (downlink) included in the frequency band 1, and two continuous CCs (center frequencies f1_T1 and f1_T2) are selected in a band 11 (uplink) included in the same frequency band 1.

The case 2 shows an aggregation of CCs where two non-continuous CCs (center frequencies f1_R1 and f1_R3; Intra CA case) are selected in the band 12 included in the frequency band 1, and two non-continuous CCs (center frequencies f1_T1 and f1_T3) are selected in the band 11 included in the same frequency band 1.

The case 3 shows an aggregation of CCs where a CC (center frequency f1_R1) is selected in the band 12 included in the frequency band 1, a CC (center frequency f2_R1) is selected in the band 22 included in the frequency band 2, and a CC (center frequency f1_T1) is selected in the band 11 included in the frequency band 1. The case 3 shows that two non-continuous CCs (Inter CA case) for downlink communication are selected from different frequency bands 1 and 2, and one CC is selected for uplink communication.

The cases 4, 5, and 6 are associated with the cases 1, 2, and 3, respectively. For example, the case 4 shows an aggregation of CCs where the band 12 is used for downlink/uplink communication, and CCs are selected according to time bands. The case 4 shows an aggregation of CCs where three continuous CCs (center frequencies f1_1, f1_2, and f1_3) are selected in the band 12 for downlink communication, and two continuous CCs (center frequencies f1_1 and f1_2) are selected in the band 12 for uplink communication.

Additionally, regarding non-continuous CCs in the same frequency band (for example, the center frequencies f1_R1 and f1_R3 shown in FIG. 34), there are three following cases: a case where multiple base stations transmit transmission signals while synchronizing timings of frames or the like (referred to as inter-base station apparatus synchronization); a non-synchronized case where each base station apparatus transmits a transmission signal independently; and a case where a channel delay occurs even if inter-base station apparatus synchronization is performed, such as when timing difference occurs among frames of OFDM (Orthogonal Frequency Division Multiplexing) signals, thereby causing non-synchronization.

Further, regarding transmission by a base station apparatus using continuous CCs (for example, the center frequencies f1_R1 and f1_R2) in the same frequency band, various technologies have been proposed in consideration of elements, such as the backward compatibility with the LTE system, the radio channel raster of 100 kHz UMTS (Universal Mobile Telecommunications System), a guard band between two adjacent CCs, guard bands on both ends of continuous CCs, or frequency use efficiency (for example, Non-Patent Document 1). In the case of continuous CCs, however, the length of a guard band between two adjacent CCs is not the integer multiple of the 15 kHz subcarrier bandwidth. For this reason, a separated baseband processing circuit is required in a transmission and reception circuit in order to maintain the compatibility with the LTE system.

To cope with the above various situations, the configuration of the mobile station apparatus depends on the following elements: (a) the number of frequency bands; (b) the total number of downlink/uplink CCs; (c) continuous/non-continuous (Intra CA/Inter CA) CCs; (d) radio transmission modes; (e) inter-downlink CC or inter-base station apparatus synchronous/asynchronous transmission; (f) various CC bandwidths (for example, 1.4 MHz, 3 MHz, 5 MHz, 10 MHz, 15 MHz, or 20 MHz); (g) the bandwidth of multiple continuous CCs each having 15 kHz OFDM subcarrier bandwidth (for example, 100 MHz); and the like (for example, Non-Patent Documents 2 and 3).

(Relationship Between Another Introduced LTE-A Technology and Combination of Mobile Station Apparatus Configurations)

As requirement conditions for the LTE-A (Non-Patent Document 4), the data transmission speeds of 100 Mbps for downlink and 75 Mbps for uplink are required while a mobile station apparatus moves at the high speed. While the mobile station apparatus moves at the fixed speed, the data transmission speeds of 1000 Mbps for downlink and 500 Mbps for uplink are required. To achieve these transmission speeds, the high order MIMO technology is introduced other than the introduction of the CA technology. For example, downlink 8.times.8 MIMO (the number of transmission antennas of the base station apparatus is 8, and the number of reception antennas of the mobile station apparatus is 8) can achieve the data transmission speed of 1000 Mbps in the 100 MHz transmission band. Uplink 4.times.4 MIMO can achieve the data transmission speed of 600 Mbps in the 40 MHz transmission band. Additionally, CoMP (coordinated multipoint) technology for communication between base station apparatuses and uplink transmission diversity technology are introduced in order to enlarge the data transmission speed of a cell edge or to enlarge the cell coverage area.

Therefore, the configuration of the mobile station apparatus also depends on the following elements: (h) downlink/uplink MIMO methods; (i) methods of CoMP communication between base station apparatuses; (j) uplink transmission diversity methods; and the like.

(Relationship Between Carrier Operation State and Combination of Mobile Station Apparatus Configurations)

Frequency assignment for the IMT-Advanced has been determined at the world radio communication conference 2007 (WRC-07). However, all of the current IMT bands (Non-Patent Documents 4 and 5) are not common to each country. Each mobile telephone service provider uses the frequencies individually assigned to the country of the provider. According to the state of frequency assignment to each country, the mobile telephone service providers use different transmission modes (TDD, FDD). Additionally, the integration of different transmission modes (for example, mixture of different transmission modes between a macrocell and a microcell, between an in-door area and an out-door area, or between a cell neighborhood and a cell edge) has been proposed. Therefore, the configuration of the mobile station apparatus is more complicated in further consideration of the following elements: (k) the state of frequency assignment to each mobile telephone service provider; and (l) domestic/international roaming (Non-Patent Documents 6, 7, and 8).

The above elements of (a) to (l) have not caused significant effect on the configuration of the mobile station apparatus in the mobile communication system of the related art.

For example, regarding the LTE system, categories of the mobile station apparatus (UE categories; 5 types) can be defined by the buffer size of data processing software of the mobile station apparatus (maximum downlink data speed of 10 Mbps to 300 Mbps) and the maximum MIMO configuration (1×1, 2×2, 4×4). Once this category is determined, the configuration of the mobile station apparatus can be fixed. In other words, five types of mobile station apparatuses may be provided to each mobile telephone service provider. Additionally, five types of mobile station apparatuses may be distributed in the market.

CITATION LIST

Non-Patent Document

[Non-Patent Document 1] NTT DoCoMo, INC. R1-083015, 3GPP TSG-RAN1 Meeting #54bis, Jeju, Korea 18-22, August, 2008

[Non-Patent Document 2] Motorola, R1-083828, 3GPP TSG-RAN1 Meeting #53bis, Prague, Czech Republic, Sep. 29-Oct. 3, 2008

[Non-Patent Document 3] LG Electronics, R1-082946, 3GPP TSG-RAN1 Meeting #54bis, Jeju, Korea 18-22, August, 2008

[Non-Patent Document 4] 3GPP TR36.913, Requirements for Further Advancements for E-UTRA

[Non-Patent Document 5] 3GPP TS 36.101, User Equipment (UE) radio transmission and reception

[Non-Patent Document 6] NTT DoCoMo, T-Mobile Intl., CMCC, Orange, Vodafone, Telecom Italia, R4-091011, 3GPP TSG-RAN WG4 Meeting #50, Athens, Greece, Feb. 9-13, 2009

[Non-Patent Document 7] Ericsson, R4-090594, 3GPP TSG-RAN WG4 Meeting #50, Athens, Greece, Feb. 9-13, 2009

[Non-Patent Document 8] Nokia, R4-091204, 3GPP TSG-RAN WG4 Meeting #50bis, Seoul, South Korea, 23-27 Mar. 2009

DISCLOSURE OF THE INVENTION

Problems to be Solved by the Invention

As explained above, the mobile station apparatus and the base station apparatus in the LTE-A communication system communicate with each other using one or more CCs (component carriers).

Even if multiple CCs are assigned to the mobile station apparatus based on the categories of the mobile station apparatus of the related art, however, there have been some cases where the mobile station apparatus cannot perform communication using the assigned CC. Adequate radio resource assignment to the mobile station cannot be achieved. Additionally, it is difficult to achieve a reduction in complexity of circuits, lower power consumption, lower cost, miniaturization, and higher productivity while achieving the maximum compatibility with various LTE-A technical elements. Thus, the related art has had demerits in that radio resources adequate for communication between the mobile station apparatus and the base station apparatus cannot be assigned.

The present invention has been made in view of the above situations. An object of the present invention is to provide a mobile station apparatus, a base station apparatus, a wireless communication system, a communication control method, and a communication control program, which can assign

BRIEF DESCRIPTION OF THE DRAWINGS

FIG. 5 is an explanatory diagram illustrating radio parameters according to the first embodiment.

FIG. 6 is an explanatory diagram illustrating the frequency band numbers according to the first embodiment.

FIG. 7 is an explanatory diagram illustrating the BB frequency bandwidth numbers according to the first embodiment.

FIG. 11 is an explanatory diagram illustrating transmission and reception apparatus configuration information converted into abstract syntax notation 1 according to the first embodiment.

FIG. 12 is a schematic diagram illustrating an example of an LTE-A mobile station communication capability message according to the first embodiment.

FIG. 13 is a schematic diagram illustrating another example of the LTE-A mobile station communication capability message according to the first embodiment.

FIG. 14 is a schematic diagram illustrating an example of the transmission and reception apparatus configuration information according to the first embodiment.

FIG. 16 is a schematic diagram illustrating LTE mobile station categories according to the related art.

FIG. 17 is a schematic diagram illustrating an example of transmission and reception apparatus configuration information according to a second embodiment of the present invention.

FIG. 18 is a schematic diagram illustrating an example of LTE-A mobile station category relationship information according to the second embodiment.

FIG. 19 is a schematic diagram illustrating another example of the LTE-A mobile station category relationship information according to the second embodiment.

FIG. 20 is a schematic diagram illustrating an example of LTE-A mobile station category relationship information according to a modified example 1 of the second embodiment.

FIG. 21 is a schematic diagram illustrating an example of LTE-A mobile station category relationship information according to a modified example 2 of the second embodiment.

FIG. 22 is a schematic diagram illustrating another example of the LTE-A mobile station category relationship information according to the modified example 2 of the second embodiment.

FIG. 24 is a schematic diagram illustrating an example of LTE-A mobile station category information converted into abstract syntax notation 1 according to the second embodiment.

FIG. 25 is a schematic diagram illustrating LTE-A mobile station category information converted into abstract syntax notation 1 according to a modified example 3 of the second embodiment.

FIG. 27 is a schematic diagram illustrating an example of an LTE-A mobile station communication capability message according to the third embodiment.

FIG. 28 is a schematic diagram illustrating an example of transmission and reception apparatus configuration information according to the third embodiment.

FIG. 29 is a schematic diagram illustrating another example of the transmission and reception apparatus configuration information according to the third embodiment.

FIG. 30 is a schematic diagram illustrating an example of transmission and the reception apparatus configuration number information according to a fourth embodiment of the present invention.

FIG. 32 is a schematic diagram illustrating an example of an LTE-A mobile station communication capability message according to the fourth embodiment.

FIG. 33 is a schematic diagram illustrating another example of the LTE-A mobile station communication capability message according to the fourth embodiment.

BEST MODE FOR CARRYING OUT THE INVENTION

First Embodiment

Hereinafter, a first embodiment of the present invention is explained in detail with reference to the drawings.

Explanation of the first embodiment is given with respect to a case where a mobile station apparatus transmits a mobile station apparatus capability message (transmission and reception capability information) including the number of RF transmission and reception branches, the number of baseband modulation and demodulation branches, the frequency band number, and the baseband frequency bandwidth number; and a base station apparatus assigns, based on the mobile station apparatus capability message, radio resources to be used for communication with the mobile station apparatus, in other words, resource blocks RB of a radio frame of an OFDM signal included in an uplink/downlink CC (component carrier), which are to be used by each mobile station apparatus. Here, radio parameters, such as the number of RF transmission and reception branches, are expressed by a unified structural description to generate information in one data format, thereby enabling the mobile station apparatus capability message to be compatible with various LTE-A technical elements.

(Regarding Communication System)

Figure 1:
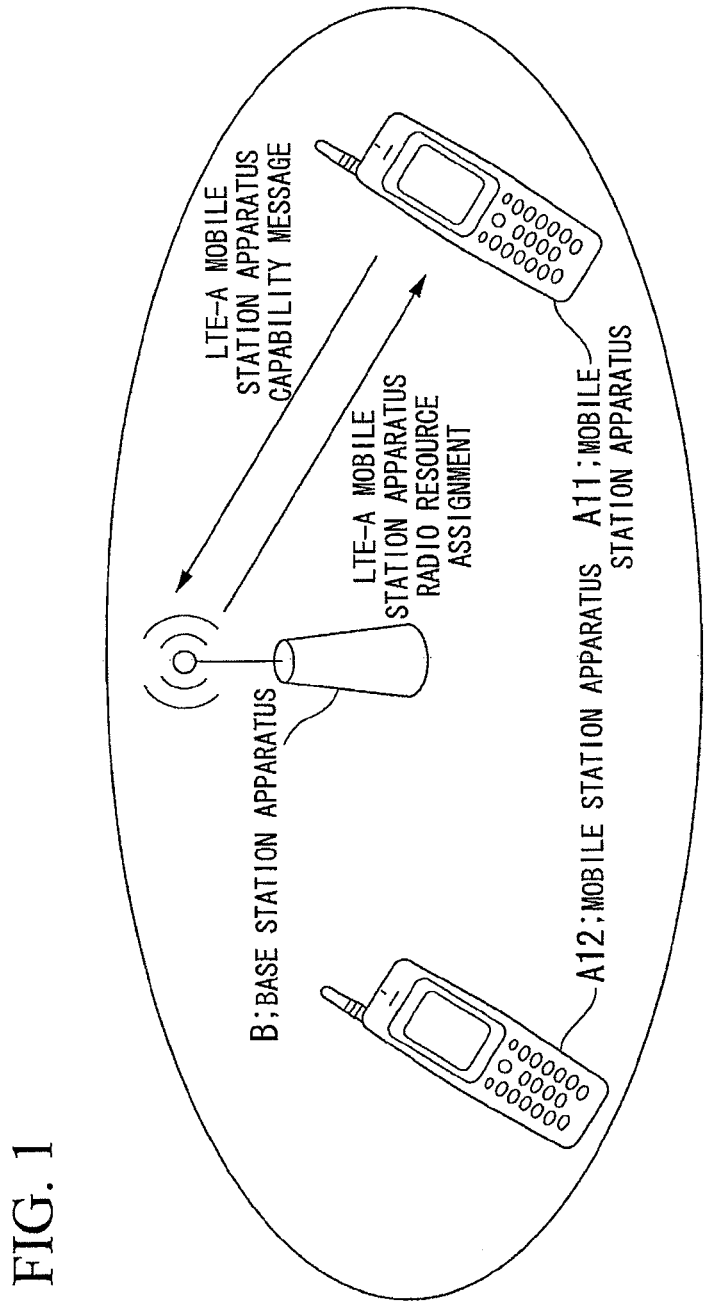
FIG. 1 is a conceptual diagram illustrating a communication system according to a first embodiment of the present invention.

FIG. 1 is a conceptual diagram illustrating a communication system according to a first embodiment of the present invention. In FIG. 1, a base station apparatus B communicates with mobile station apparatuses A11 and A12. FIG. 1 shows that the mobile station apparatus A11 transmits a mobile station apparatus capability message to a base station apparatus B. Additionally, FIG. 1 shows that the base station apparatus B assigns radio resources to the mobile station apparatus A11 based on the mobile station apparatus capability message received from the mobile station apparatus A11. Here, communication from the mobile station apparatus A11 or A12 to the base station apparatus B is referred to as uplink communication. Communication from the base station apparatus B to the mobile station apparatus A11 or A12 is referred to as downlink communication.

Hereinafter, each of the mobile station apparatuses A11 and A12 is referred to as a mobile station apparatus A1.

The mobile station apparatus A1 and the base station apparatus B perform communication using the carrier aggregation technology (hereinafter referred to as CA technology). The CA technology is such technology that the mobile station apparatus A1 simultaneously receives signals transmitted from the base station apparatus B, using continuous or non-continuous downlink component carriers each having a small frequency bandwidth (for example, 20 MHz bandwidth), and generates a pseudo carrier signal having a large frequency bandwidth (for example, 100 MHz bandwidth of five CCs), thereby achieving high-speed downlink data transmission. Similarly, according to the CA technology, the base station apparatus B simultaneously receives CC signals transmitted from the mobile station apparatus A1, using continuous or non-continuous uplink component carriers each having a small frequency bandwidth (for example, 20 MHz bandwidth), and generates a pseudo carrier signal having a large frequency bandwidth (for example, 40 MHz bandwidth of two CCs), thereby achieving high-speed uplink data transmission.

(Regarding CA Technology)

Hereinafter, the CA technology is explained in detail.

Figure 2:
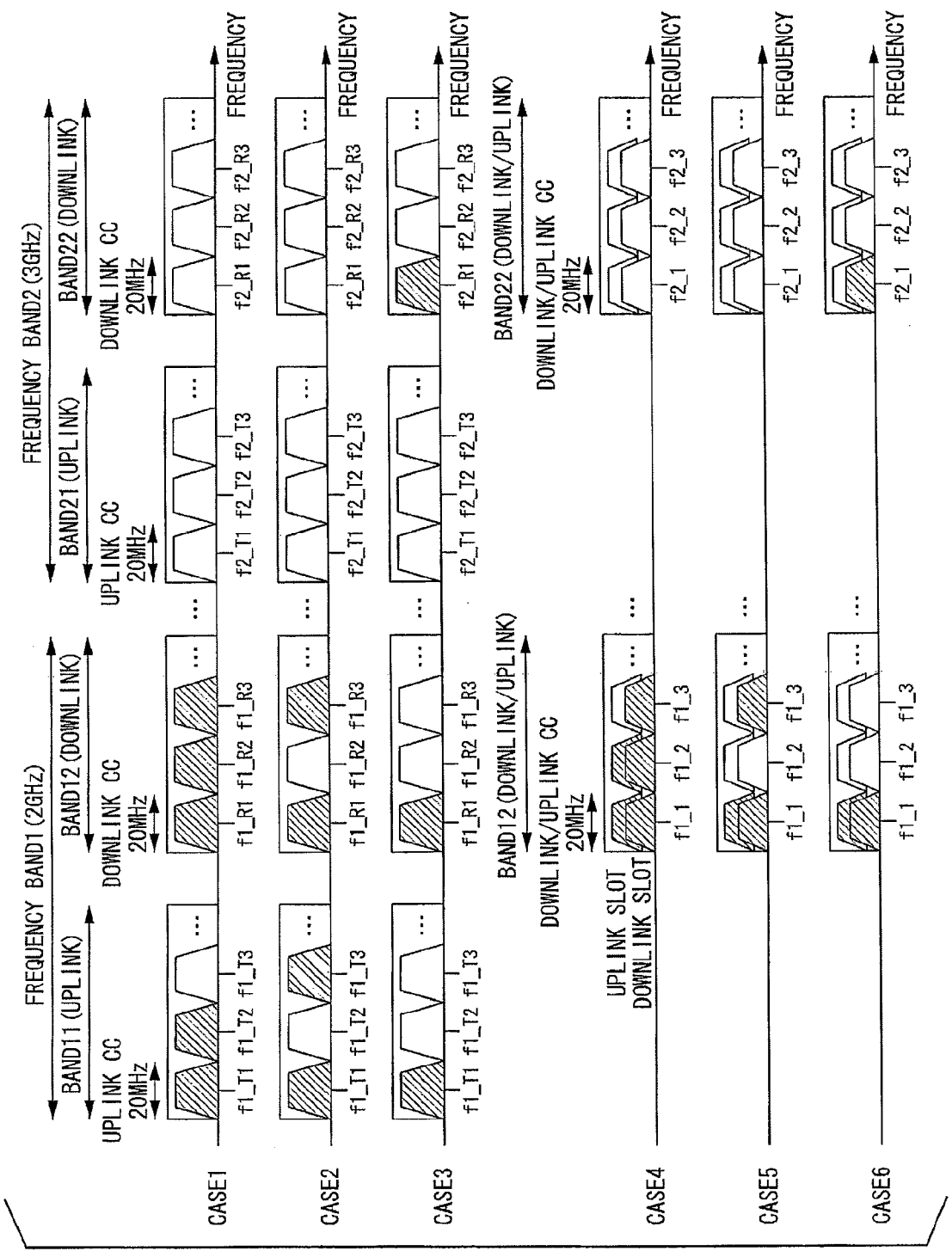
FIG. 2 is a schematic diagram illustrating an aggregation of CCs according to the first embodiment.

FIG. 2 is a schematic diagram illustrating an aggregation of CCs according to the first embodiment. In FIG. 2, a horizontal axis denotes frequency. Additionally, FIG. 2 shows a case where there are two frequency bands, which are a frequency band 1 (2 GHz band) and a frequency band 2 (3 GHz band). Further, FIG. 2 shows cases 1 to 6 separated in the vertical direction. The cases 1 to 3 show cases of a FDD (Frequency Division Duplex) transmission mode. The cases 4 to 6 show the cases of a TDD (Time Division Duplex) transmission mode.

In FIG. 2, the case 1 shows an aggregation of CCs where three continuous CCs (center frequencies f1_R1, f1_R2, and f1_R3) are selected in a band 12 (downlink) included in the frequency band 1, and two continuous CCs (center frequencies f1_T1 and f1_T2) are selected in a band 11 (uplink) included in the same frequency band 1.

The case 2 shows an aggregation of CCs where two non-continuous CCs (center frequencies f1_R1 and f1_R3; Intra CA case) are selected in the band 12 included in the frequency band 1, and two non-continuous CCs (center frequencies f1_T1 and f1_T3) are selected in the band 11 included in the same frequency band 1.

The case 3 shows an aggregation of CCs where a CC (center frequency f1_R1) is selected in the band 12 included in the frequency band 1, a CC (center frequency f2_R1) is selected in the band 22 included in the frequency band 2, and a CC (center frequency f1_T1) is selected in the band 1 included in the frequency band 1. The case 3 shows that two non-continuous CCs (Inter CA case) for downlink communication are selected from different frequency bands 1 and 2, and one CC is selected for uplink communication.

The cases 4, 5, and 6 are associated with the cases 1, 2, and 3, respectively. For example, the case 4 shows an aggregation of CCs where the band 12 is used for downlink/uplink communications, and CCs are selected according to time bands. The case 4 shows an aggregation of CCs where three continuous CCs (center frequencies f1_1, f1_2, and f1_3) are selected in the band 12 for downlink communication, and two continuous CCs (center frequencies f1_1 and f1_2) are selected in the band 12 for uplink communication.

The mobile station apparatus A1 and the base station apparatus B perform communication using the selected CCs. Here, the mobile station apparatuses A1 occasionally include transmission and reception apparatuses having different configurations from one another, and the CCs to be used for the CA technology differ. Hereinafter, multiple examples of configurations (transmission and reception apparatuses a1 to a3) regarding the transmission and reception apparatus included in the mobile station apparatus A1 are explained.

(Regarding Configuration of Transmission and Reception Apparatus a1)

Firstly, a transmission and reception apparatus a1 that performs communication using one CC is explained here.

Figure 3:
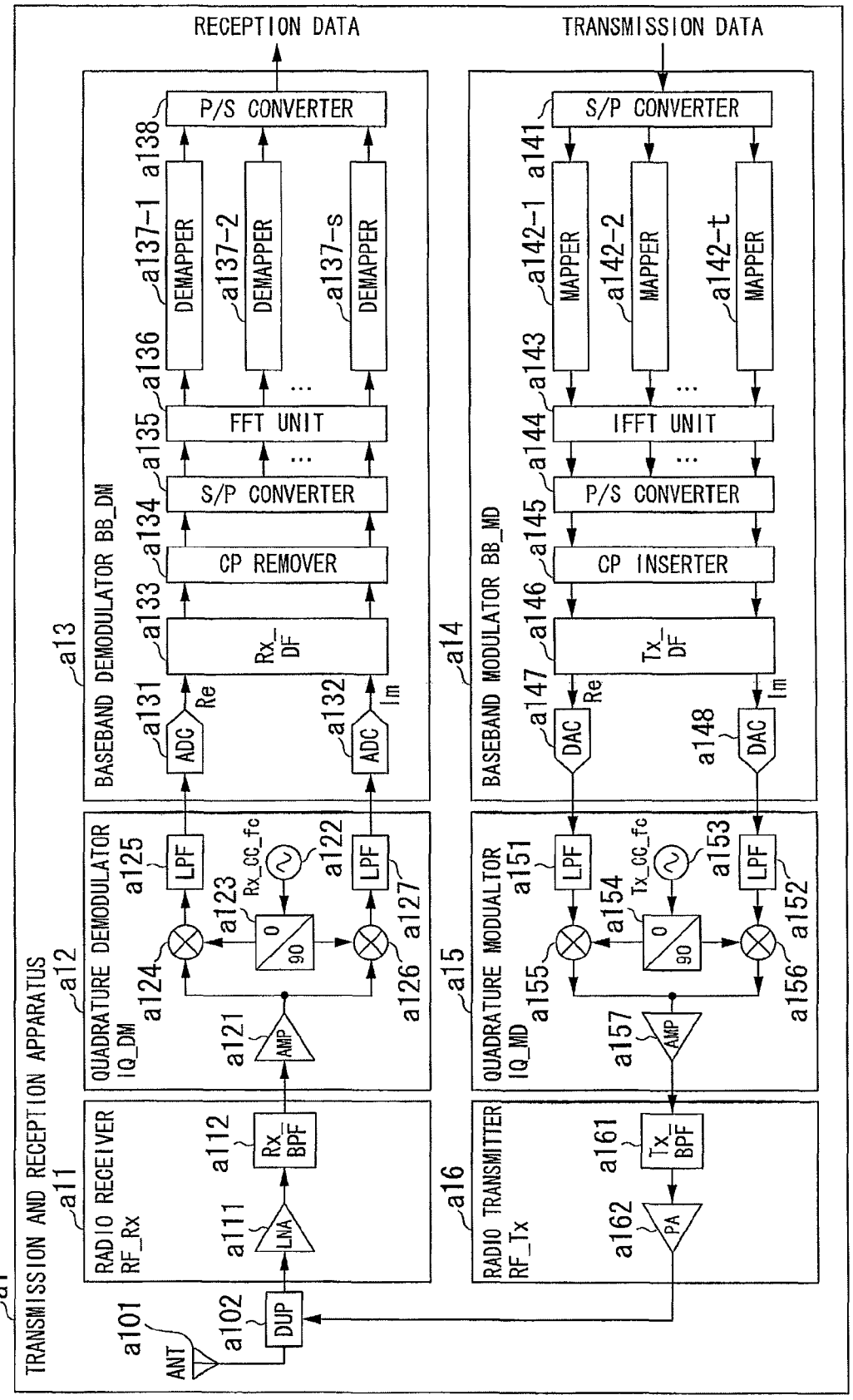
FIG. 3 is a schematic block diagram illustrating a configuration of a transmission and reception apparatus according to the first embodiment.

FIG. 3 is a schematic block diagram illustrating a configuration of the transmission and reception apparatus a1 according to the first embodiment. In FIG. 3, the transmission and reception apparatus a1 includes: a transmission and reception common antenna a101; an antenna duplexer (DUP) a102; a radio receiver (RF_Rx) a11; a quadrature demodulator (IQ_DM) a12; a baseband demodulator (BB_DM) a13; a baseband modulator (BB_MD) a14; a quadrature modulator (IQ_MD) a15; and a radio transmitter (RF_Tx) a16.

Firstly, a reception process is explained here.

The antenna duplexer a102 outputs to the radio receiver a11, a signal received from the base station apparatus B via the transmission and reception common antenna a101. Additionally, the antenna duplexer a102 transmits the signal received from the radio transmitter a16, to the base station apparatus B through the transmission and reception common antenna a101.

The radio receiver a11 includes: an LNA (Low Noise Amplifier) a111; and an RF reception band pass filter (Rx_BPF) a112. The LNA a111 amplifies the signal received from the antenna duplexer a102, and outputs the amplified signal to the RF reception band pass filter a112. The RF reception band pass filter a112 extracts a signal in the reception band (for example, the band 12 shown in FIG. 2) from the signal received from the antenna duplexer a102, and outputs the extracted signal to the quadrature demodulator a12.

The quadrature demodulator a12 includes: an amplifier (AMP) a121; a local oscillator a122; a phase shifter a123; multipliers a124 and a126; and LPFs (Low Pass Filter) a125 and a127. The amplifier a121 amplifies the signal received from the RF reception band pass filter a112, and outputs the amplified signal to the multipliers a124 and a126. The local oscillator a122 generates a sine wave, and outputs the generated sine wave to the phase shifter a123. The phase shifter a123 outputs to the multiplier a124, the sine wave received from the local oscillator a122. Additionally, the phase shifter a123 shifts, by 90 degrees, the phase of the sine wave received from the local oscillator a122 to generate a cosine wave, and outputs the generated cosine wave to the multiplier a126.

The multiplier a126 multiplies the signal received from the amplifier a121 by the sine wave received from the phase shifter a123, thereby extracting an in-phase component of the signal and downconverting the signal. The multiplier a124 outputs the signal multiplied by the sine wave to the LPF a125. The LPF a125 extracts a low frequency component of the signal received from the multiplier a124. The LPF a125 outputs an in-phase component of the extracted signal to the baseband demodulator a13.

The multiplier a126 multiplies the signal received from the amplifier a121 by the cosine wave received from the phase shifter a123, thereby extracting an orthogonal component of the signal and downconverting the signal. The multiplier a126 outputs to the LPF a127, the signal multiplied by the sine wave. The LPF a127 extracts a low frequency component of the signal received from the multiplier a126. The LPF a127 outputs to the baseband demodulator a13, an in-phase component of the extracted signal.

The baseband demodulator includes: AD (Analog to Digital) Converters (ADC) a131 and a132; a digital filter (Rx_DF) a133; a CP (Cyclic Prefix) remover a134; an S/P (Serial/Parallel) converter a135; an FFT (Fast Fourier Transform) unit a136; demappers a137-1 to a137-s; and a P/S (Parallel/Serial) converter a138. The AD converters a131 and a132 respectively convert the signals received from the LPFs a125 and a127, and output the converted signals to the digital filter a133. The digital filter a133 extracts a signal in the reception band (for example, f1_R1 shown in FIG. 2) from the signal received from the AD converters a131 and a132, and outputs the extracted signal to the CP remover a133. The CP remover a134 removes a CP from the signal received from the digital filter a133, and outputs the resultant signal to the S/P converter a135. The S/P converter a135 performs serial-to-parallel conversion on the signal received from the CP remover a134, and outputs the resultant signals to the FFT unit a136. The FFT unit a136 performs Fourier conversion to convert the signals received from the S/P converter a135 from time domain signals to frequency domain signals, and outputs the frequency domain signals to the demappers a137-1 to a137-s. The demappers a137-1 to a137-s demap the frequency domain signals received from the FFT unit a136, and output the demapped signals to the P/S converter a138. The P/S converter a138 performs parallel-to-serial conversion on the signals received from the respective demappers a137-1 to a137-s to obtain reception data, and outputs the obtained reception data.

Next, a transmission process is explained here.

The baseband modulator a14 includes: an S/P (Serial/Parallel) converter a141; mappers a142-1 to a142-t; an IFFT (Inverse Fast Fourier Transform) unit a143; a P/S (Parallel/Serial) converter a144; a CP inserter a145; a digital filter (Tx_DF) a146; and DA (Digital to Analog) converters (DAC) a147 and a148. The S/P converter a141 performs serial-to-parallel conversion on input transmission data, and outputs the parallel signals to the mappers a142-1 to a142-t. The mappers a142-1 to a142-t map the signals received from the S/P converter a141, and outputs the mapped signals to the IFFT unit a143. The IFFT unit a143 performs inverse Fourier transform to convert the signals received from the mappers a142-1 to a142-t from frequency domain signals into time domain signals, and outputs the time domain signals to the P/S converter a144. The P/S converter a144 performs parallel-to-serial conversion on the time domain signals received from the IFFT unit a143, and outputs the serial signal to the CP inserter a145. The CP inserter a145 inserts a CP into the signal received from the P/S converter a144, and outputs the resultant signal to the digital filter a146. The digital filter a146 extracts a signal in the transmission band (for example, f1_T1 shown in FIG. 2) from the signal received from the CP inserter a145. The digital filter a146 outputs an in-phase component and an orthogonal component of the signal received from the extracted signal to the DA converters a147 and a148, respectively. The DA converters a147 and a148 respectively convert the signals (digital signals) received from the digital filter a146 into analog signals, and output the analog signals to the quadrature modulator a15.

The quadrature modulator a15 includes: LPFs a151 and a152; a local oscillator a153; a phase shifter a154; multipliers a155 and a156; and an amplifier (AMP) a157. The LPFs a151 and a152 extract low frequency components from the signals received from the DA converters a147 and a148, respectively. The local oscillator a153 generates a sine wave, and outputs the sine wave to the phase shifter a154. The phase shifter a154 outputs to the multiplier a155, the sine wave received from the local oscillator a153. Additionally, the phase shifter a154 shifts, by 90 degrees, the phase of the sine wave received from the local oscillator a153 to generate a cosine wave, and outputs the generated cosine wave to the multiplier a156.

The multiplier a155 multiplies the signal received from the LPF a151 by the sine wave received from the phase shifter a154, thereby generating an in-phase component wave and upconverting the signal. The multiplier a155 outputs to the amplifier a157, the signal multiplied by the sine wave. The multiplier a156 multiplies the signal received from the LPF a152 by the cosine wave received from the phase shifter a154, thereby generating an orthogonal component wave and upconverting the signal. The multiplier a156 outputs to the amplifier a157, the signal multiplied by the cosine wave. The amplifier a157 amplifies the signals received from the multipliers a155 and a156, and outputs the amplified signals to the radio transmitter a16.

The radio transmitter a16 includes: an RF transmission band pass filter (Tx_BPF) a161; and a PA (Power Amplifier) a162. The RF transmission band pass filter a161 extracts a signal in the transmission band (for example, the band 11 shown in FIG. 2) from the signal received from the amplifier a157, and outputs the extracted signal to the PA a162. The PA a162 amplifies the signal received from the RF transmission band pass filter a161, and outputs the amplified signal to the antenna duplexer a102.

Thanks to the above configuration, the transmission and reception apparatus a1 transmits signals using uplink CCs having the center frequency f1_T1 and the 20 MHz frequency bandwidth shown in FIG. 2. The transmission and reception apparatus a1 having the configuration shown in FIG. 3 generates CCs for uplink OFDM signals. However, the present invention is not limited thereto, and another combination of circuit blocks forming a configuration of SC-FDMA (Single-Carrier Frequency-Division Multiple Access) may be used to generate continuous uplink SC-FDMA signals or non-continuous SC-FDMA (Clustered DFT-S-OFDM or CL-DFT-S-OFDM) signals to be transmitted using CCs. Additionally, the direct-conversion-type transmission and reception apparatus a1 has been explained with reference to FIG. 3. However, the present invention is not limited thereto, and may be applied to another transmission and reception apparatus, such as a superheterodyne-type transmission and reception apparatus. In this case, the present invention can be applied thereto if the correspondence relationship of the quadrature demodulators a12 and a15 is modified.

Figure 4:
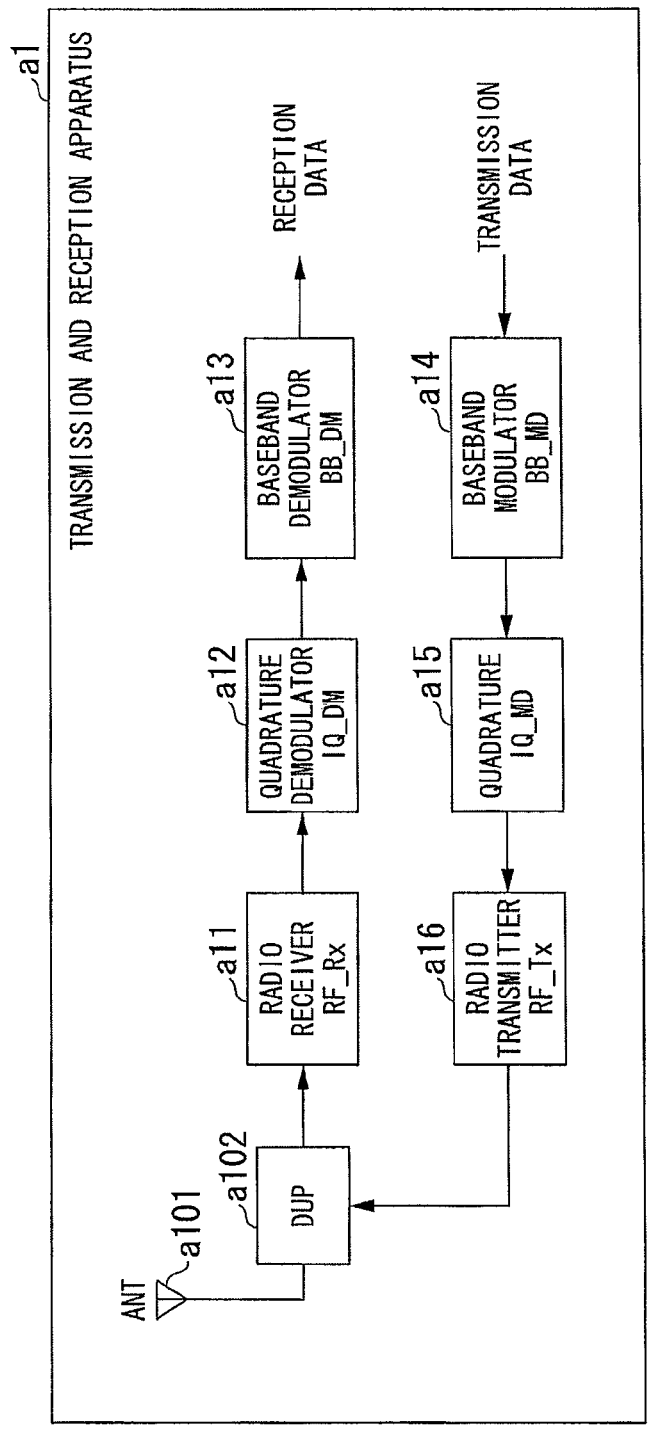
FIG. 4 is a schematic block diagram illustrating a simplified configuration of the transmission and reception apparatus according to the first embodiment.

FIG. 4 is a schematic block diagram illustrating a simplified configuration of the transmission and reception apparatus a1 according to the first embodiment. FIG. 4 is obtained by simplifying the configuration of the transmission and reception apparatus a1 shown in FIG. 3. The transmission and reception apparatus a1 includes: a transmission and reception common antenna a101; an antenna duplexer (DUP) a102; a radio transmitter (RF_Rx) a11; a radio receiver (RF_Rx) a11; a quadrature demodulator (IQ_DM) a12; a baseband demodulator (BB_DM) a13; a baseband modulator (BB_MD) a14; a quadrature modulator (IQ_MD) a15; and a radio transmitter (RF_Tx) a16.

(Regarding Radio Parameters)

FIG. 5 is an explanatory diagram illustrating radio parameters according to the first embodiment. FIG. 5 shows that radio parameters include RF_BWm and BB_BWn. Here, m denotes the number of a frequency band for a system operation (referred to as the frequency band number), such that m=1, 2, . . . , M. For example, the frequency band numbers of the frequency bands 1 and 2 shown in FIG. 2 are 1 and 2, respectively. Additionally, n denotes the number of a frequency bandwidth of a baseband (hereinafter referred to as the BB frequency bandwidth number), such that n=1, 2, . . . , N.

Here, parameters RF_BWm are associated with the transmission and reception common antenna a101, the antenna duplexer a102, the radio receiver a11, the quadrature demodulator a12, the quadrature modulator a15, and the radio transmitter a16, which are shown in FIG. 4. Additionally, parameters BB_BWn are associated with the quadrature demodulator a12, the baseband demodulator a13, the baseband modulator a14, and the quadrature modulator a15, which are shown in FIG. 4. The details of these associations are explained later with reference to FIGS. 6 and 7.

FIG. 6 is an explanatory diagram illustrating the frequency band numbers according to the first embodiment (excerpted partially from the table 5. 5-1 EUTRA operating bands of 3GPP TS 36.101). FIG. 6 shows the relationship among the frequency band numbers, uplink frequency bands, downlink frequency bands, frequency bandwidths, and transmission modes. For example, the relationship on the first row indicates that a frequency band having the frequency band number "1" (see the frequency band 1 shown in FIG. 2) is associated with the uplink frequency band "1920 MHz to 1980 MHz" (see the band 11 shown in FIG. 2), the downlink frequency band "2110 MHz to 2170 MHz" (see the band 12 shown in FIG. 2), the frequency band "60 MHz," and the transmission mode "FDD." Along with addition of frequency bands for the IMT-Advanced, the frequency band numbers (from the number 41) for the LTE-A system are expected to be added to a related specification.

Based on the parameter RF_BWm, operation frequencies and operation frequency bands of the transmission and reception common antenna a101, the antenna duplexer a102, the radio receiver a11, the quadrature demodulator a12, the quadrature modulator a15, and the radio transmitter a16 are determined.

FIG. 7 is an explanatory diagram illustrating the BB frequency bandwidth numbers according to the first embodiment. FIG. 7 shows the relationship between the BB frequency bandwidth numbers and frequency bandwidths. For example, the BB frequency bandwidth numbers 1, 2, 3, 4, and 5 indicate aggregations of 20 MHz CC bandwidths. Additionally, the BB frequency bandwidth numbers 6, 7, and more may indicate aggregations of CC bandwidths of 1.4 MHz, 3 MHz, 5 MHz, 10 MHz, and 15 MHz.

For the downlink, the downconverter (the local oscillator a122, the phase shifter a123, and the multipliers a124 and a126) of the quadrature demodulator a12 shown in FIG. 4, frequency characteristics of the LPFs a125 and a127 shown in FIG. 4, frequency characteristics of the digital filter a133 of the baseband demodulator a13 shown in FIG. 4, and sampling frequencies of the AD converter a131 and the FFT unit a136 shown in FIG. 4 are determined based on the parameters of the BB frequency bandwidth numbers. Similarly, for the uplink, upconverter (the local oscillator a153, the phase shifter a154, and the multipliers a155 and a156) of the quadrature modulator a15 shown in FIG. 4, frequency characteristics of the LPFs a151 and a152 shown in FIG. 4, frequency characteristics of the digital filter a146 of the baseband modulator a14 shown in FIG. 4, and sampling frequencies of the IFFT unit a143 and the DA converters a147 and a148 shown in FIG. 4 are determined based on the parameters of the BB frequency bandwidth numbers (Regarding Configuration of Transmission and Reception Apparatus a2)

Next, the transmission and reception apparatus a2, which performs communication using one frequency band and multiple CCs (L downlink CCs and K uplink CCs), is explained here.

Figure 8:
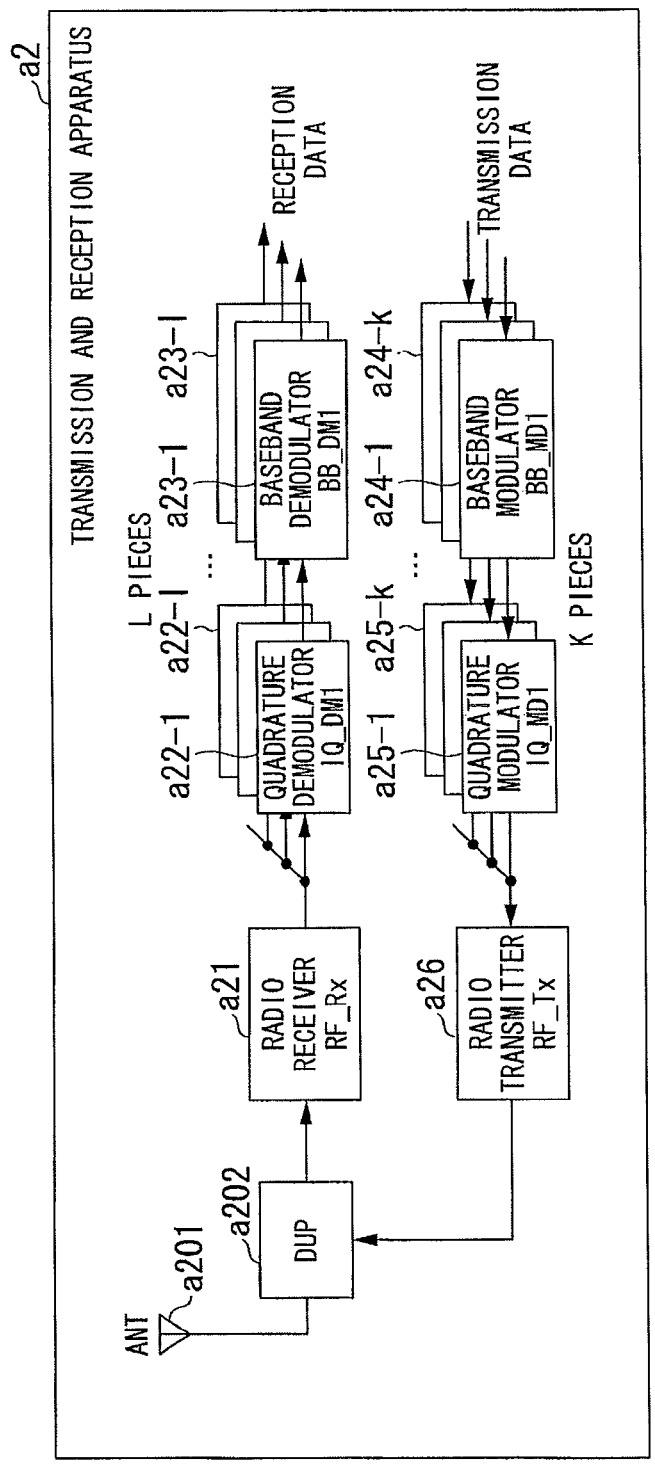
FIG. 8 is a schematic block diagram illustrating a simplified configuration of a transmission and reception apparatus according to the first embodiment.

FIG. 8 is a schematic block diagram illustrating a simplified configuration of the transmission and reception apparatus a2 according to the first embodiment. In FIG. 8, the transmission and reception apparatus a2 includes: a transmission and reception common antenna a201; an antenna duplexer (DUP) a202; a radio receiver (RF_Rx) a21; L quadrature demodulators (IQ_DMl) a22-l (small letter of L; l=1, 2, . . . , L); L baseband demodulators (BB_DMl) a23-l (small letter of L); K baseband modulators (BB_MDl) a24-k (k=1, 2, . . . , K); K quadrature modulators (ID_MDl) a25-k; and a radio transmitter (RF_Tx) a26. Here, the antenna duplexer a202, the radio receiver a21, the quadrature demodulator a22-l, the baseband demodulator a23-l, the baseband modulator a24-k, and the quadrature modulator a25-k respectively have the same configurations and functions as those of the antenna duplexer a102, the radio receiver a11, the quadrature demodulator a12, the baseband demodulator a13, the baseband modulator a14, and the quadrature modulator a15, which are shown in FIG. 3. Therefore, explanations thereof are omitted here. Here, each of the quadrature demodulators a22-l and each of the baseband demodulators a23-l process signals received using associated one or more continuous downlink CCs. Additionally, each of the quadrature modulators a24-k and each of the quadrature modulators a25-k process signals to be transmitted using associated one or more continuous uplink CCs.

The transmission and reception apparatus a2 shown in FIG. 8 can receive signals using L continuous/non-continuous downlink CCs in one frequency band, and transmit signals using K continuous/non-continuous uplink CCs in one frequency band. Additionally, the transmission and reception apparatus a2 includes the L quadrature demodulators a22-l and the L baseband demodulators a23-l, thereby achieving compatibility with asynchronous transmission using downlink CCs. If the respective BB frequency bandwidth numbers BB_BWn differ, the total number of continuous/non-continuous downlink CCs, the total number of downlink CCs for asynchronous transmission, the bandwidths of continuous CCs each having the 15 kHz OFDM subcarrier bandwidth also vary, thereby enabling various aggregations. Similar explanations apply to the uplink.

(Regarding Configuration of Transmission and Reception Apparatus a3)

Next, a transmission and reception apparatus a3, which performs communication using one or more frequency bands and multiple CCs, is explained here.

Figure 9:
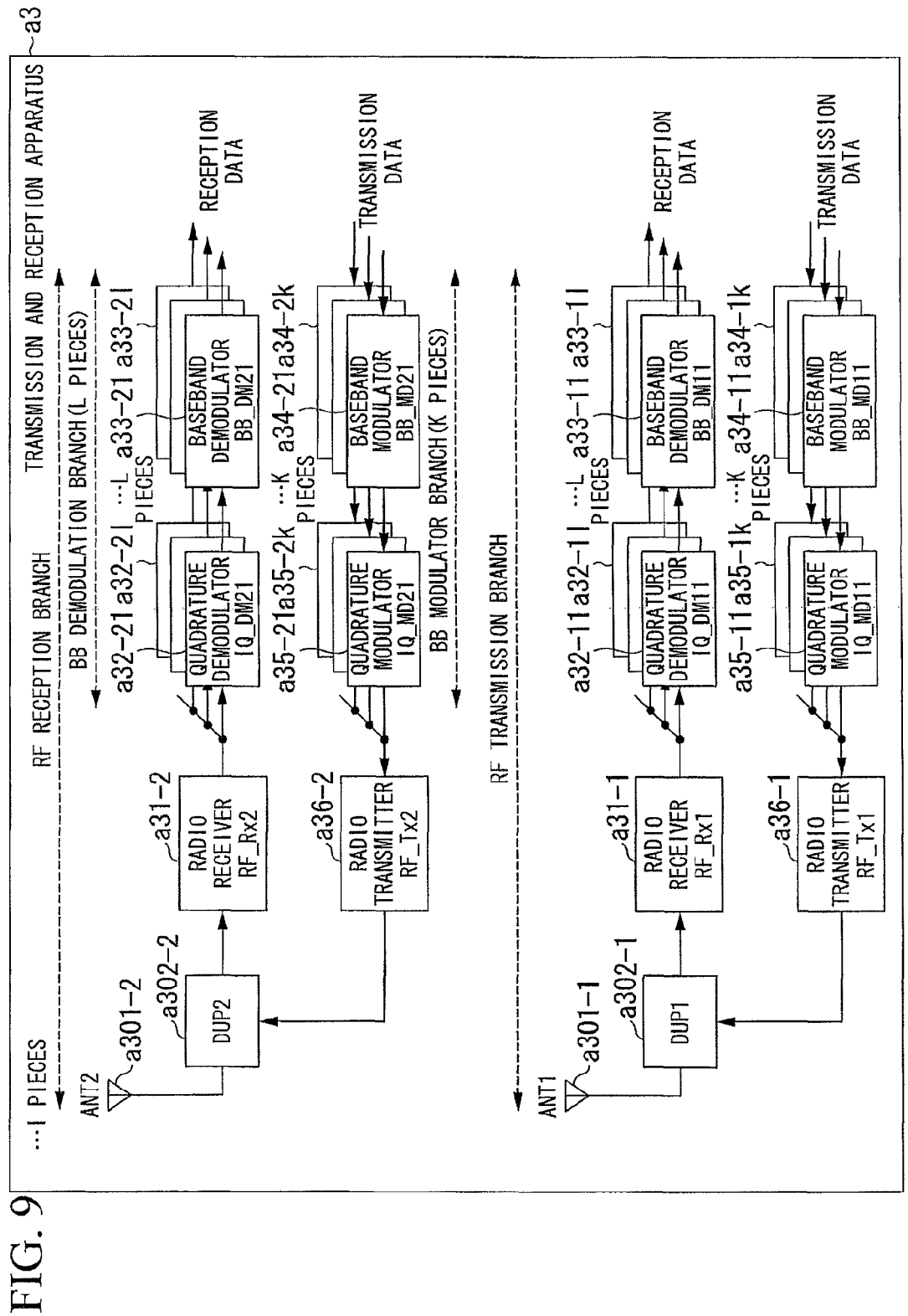
FIG. 9 is a schematic block diagram illustrating a simplified configuration of the transmission and reception apparatus according to the first embodiment.

FIG. 9 is a schematic block diagram illustrating a simplified configuration of the transmission and reception apparatus a3 according to the first embodiment. In FIG. 9, the transmission and reception apparatus a3 includes: transmission and reception common antennas a301-i (i=1, 2, ..., and I); antenna duplexers (DUPi) a302-i; radio receivers (RF_Rxi) a31-i; quadrature demodulators (IQ_DMil) a32-il (small letter of L; l=1, 2, ..., L); baseband demodulators (BB_DMil) a33-il (small letter of L); baseband modulators (BB_MDjk) a34-jk (j=1, 2, ..., I; K=1, 2, ..., K); quadrature modulators (IQ_MDjk) a35-jk; and radio transmitters (RF_Txi) a36-j. Here, the antenna duplexers a302-i, the radio receivers a31-i, the quadrature demodulators a32-il, the baseband demodulators a33-il, the baseband modulator a34-jk, the quadrature modulator a35-jk, and the radio transmitters a36-j respectively have the same configurations and functions as those of the antenna duplexer a202, the radio receiver a21, the quadrature demodulator a22-l, the baseband modulators a23-l, the baseband modulator a24-k, and the quadrature modulators a25-k, which are shown in FIG. 8. Therefore, explanations thereof are omitted here.

Here, a set of the quadrature demodulator a32-il and the baseband demodulator a33-il processes OFDM baseband signals received using the l-th (small letter of L) downlink CC included in the i-th frequency band (each set is referred to as a BB demodulation branch il, and l (small letter of L) is referred to as the BB demodulation branch number; a component carrier reception processor). Additionally, a set of the baseband modulator a34-jk and the quadrature modulator a35-jk processes OFDM baseband signals received using the k-th uplink CC included in the j-th frequency band (each set is referred to as a BB modulation branch jk, and k is referred to as the BB modulation branch number; a component carrier transmission processor). A set of the radio receiver a31-i and the BB demodulation branches il to iL process OFDM radio reception signals received in the i-th frequency band (each set is referred to as an RF reception branch i, and i is referred to as the RF reception branch number; a frequency band reception processor). Additionally, a set of the radio transmitter a36-j and the BB modulation branches jl to jK processes OFDM radio transmission signals to be transmitted in the j-th frequency band (each set is referred to as an RF transmission branch j, and j is referred to as the RF transmission branch number; a frequency band transmission processor).

Although FIG. 9 shows the case where the number of the RF reception branches is equal to that of the RF transmission branches (I pieces), the present invention is not limited thereto. The number of the RF reception branches may differ from that of the RF transmission branches. Additionally, although FIG. 9 shows the case where the number of the BB demodulation branches included in each RF reception branch is identical (L pieces), the present invention is not limited thereto. The number of the BB demodulation branches included in each RF reception branch may differ. Similarly, the number of the BB modulation branches included in each RF transmission branch may differ.

If the transmission and reception apparatus a3 transmits and receives signals in the same frequency band, the transmission and reception apparatus a3 can be compatible with a downlink/uplink MIMO method, a CoMP (coordinated multipoint) method for communication between base station apparatuses, and an uplink transmission diversity method, since the transmission and reception apparatus a3 includes multiple RF reception branches i and RF transmission branches j. If the transmission and reception apparatus a3 receives signals in different frequency bands, the transmission and reception apparatus a3 can be compatible with the above methods with respect to multiple frequency bands, since the transmission and reception apparatus a3 includes multiple RF reception branches i and the RF transmission branches j.

(Regarding Configuration of Mobile Station Apparatus A1)

Hereinafter, the mobile station apparatus A1 including the transmission and reception apparatus a1, a2, or a3 is explained.

Figure 10:
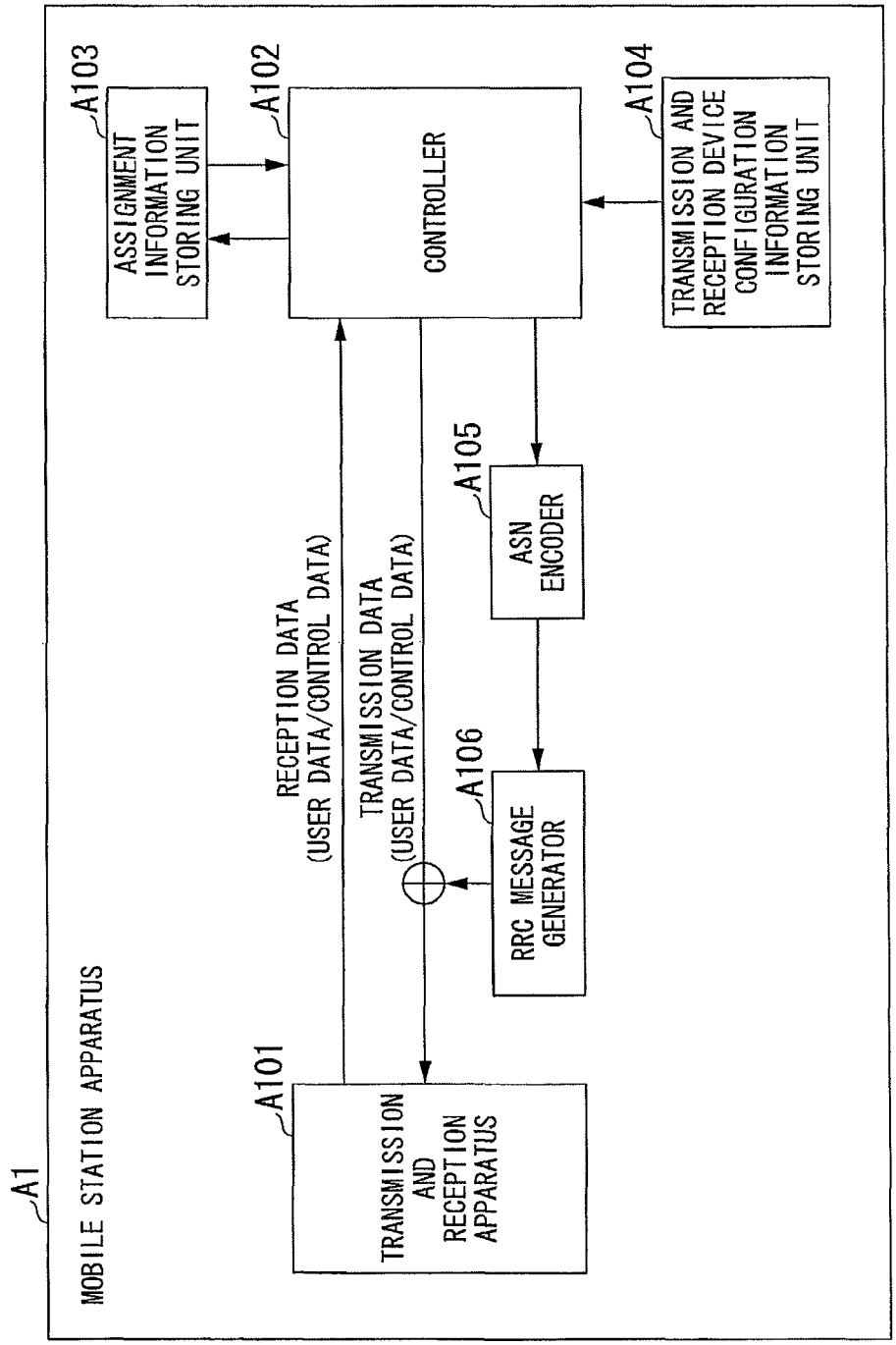
FIG. 10 is a schematic block diagram illustrating a configuration of a mobile station apparatus according to the first embodiment.

FIG. 10 is a schematic block diagram illustrating a configuration of the mobile station apparatus A1 according to the first embodiment. In FIG. 10, the mobile station apparatus A1 includes: a transmission and reception apparatus A101; a controller A102; an assignment information storing unit A103; a transmission and reception apparatus configuration information storing unit A104; an ASN (Abstract Syntax Notation) encoder A105; and an RRC (Radio Resource Control) message generator A106.

The transmission and reception apparatus A101 is the aforementioned transmission and reception apparatus a1, a2, or a3.

The controller A102 controls each unit of the mobile station apparatus A1. For example, the controller A102 receives, as control data, radio resource information assigned by the base station apparatus B. Then, the controller A102 stores the received assignment resource information in the assignment information storing unit A103. The controller A102 reads out the radio resource information from the assignment information storing unit A103, and controls transmission and reception.

The transmission and reception apparatus configuration information storing unit A104 stores transmission and reception apparatus configuration information (for example, FIG. 14, the details will be explained later) in a memory. The transmission and reception apparatus configuration information can be previously set according to the configuration of the mobile station apparatus and be written in the transmission and reception apparatus configuration information storing unit A104 at the time of factory shipment.

Additionally, the controller A102 outputs, to the ASN encoder A105, the transmission and reception apparatus configuration information stored by the transmission and reception apparatus configuration information storing unit A104. Here, the transmission and reception apparatus configuration information includes information indicating the configuration of the transmission and reception unit A101. The details of the transmission and reception apparatus configuration information are explained later with an RRC message generation process.

The ASN encoder A105 converts the transmission and reception apparatus configuration information received from the controller A102 into an abstract syntax notation 1 (ASN. 1) to perform encoding. Then, the ASN encoder A105 outputs the encoded information to the RRC message generator A106. The details of the process performed by the ASN encoder A105 will be explained later with the RRC message generation process.

The RRC message generator A106 generates an LTE-A mobile station communication capability message (UE-Advanced EUTRA-Capability) including the information received from the ASN encoder A105. Then, the RRC message generator A106 outputs the LTE-A mobile station communication capability message to the transmission and reception apparatus A101 as part of the uplink RRC message included in control data. The details of the process performed by the RRC message generator A106 will be explained later with the RRC message generation process.

The transmission and reception apparatus A101 processes, by the RF transmission branch j, the RRC message received from the RRC message generator A106, and transmits the processed message to the base station apparatus B.

Additionally, the controller A102, the assignment information storing unit A103, the transmission and reception apparatus configuration information storing unit A104, the ASN encoder A105, and the RRC message generator A106 may be included in an integrated circuit chip. Alternatively, a part of these units may be included in the transmission and reception apparatus A101, or all of these units may be included in an integrated circuit chip. Thus, the configuration is not limited.

(Regarding RRC Message Generation Process)

Hereinafter, the RRC message generation process performed by the ASN encoder A105 and the RRC message generator A106 is explained.

FIG. 11 is an explanatory diagram illustrating the transmission and reception apparatus configuration information (UE-RF-Capability shown in FIG. 12) to be included in the LTE-A mobile station communication capability message (UE-Advanced EUTRA-Capability shown in FIG. 12) converted into the abstract syntax notation 1 according to the first embodiment. FIG. 11 shows that there are radio parameters of RXi, RF_BWm, BB_DMl (small letter of L), BB_Wn, TXj, RF_BWm, BB_MDk, and BB_BWn, and these parameters have a hierarchical structure.

In FIG. 11, the parameter RXi indicates the RF reception branch number i. As explained above, the RF reception branch number i is a value such that i=1, 2, . . . , I. Here, I denotes the maximum number of RF reception branches (the maximum number of reception antennas). For example, I=8 is the case of 8.times.8 MIMO.

The parameter RF_BWm, which is lower in hierarchy than the parameter RXi, indicates the frequency band number m allocated to a frequency band in which the RF reception branch i can perform reception.

The parameter BB_DMl (small letter of L), which is lower in hierarchy than the parameter RXi, indicates the number l (small letter of L) allocated to a BB demodulation branch included in the RF reception branch i.

The parameter BB_BWn, which is lower in hierarchy than the parameter BB_DMl, indicates the BB frequency bandwidth number n allocated to a baseband frequency bandwidth of a baseband in which the BB demodulation branch l (small letter of L) can perform the process.

Additionally, in FIG. 11, the parameter TXj indicates the RF transmission branch number j. The RF transmission branch number j is a value such that i=1, 2, . . . , J. Here, J denotes the maximum number of RF transmission branches (the maximum number of transmission antennas). For example, J=4 in the case of 4.times.4 MIMO.

The parameter RF_BWm, which is lower in hierarchy than the parameter TXj, indicates the frequency band number m allocated to a frequency band in which the RF transmission branch j can perform transmission.

The parameter BB_MDk, which is lower in hierarchy than the parameter TXj, indicates the number k allocated to a BB modulation branch included in the RF transmission branch j.

The parameter BB_BWn, which is lower in hierarchy than the parameter BB_MDk, indicates the BB frequency bandwidth number n allocated to a baseband frequency bandwidth of a baseband in which the BB modulation branch k can perform the process.

FIG. 12 is a schematic diagram illustrating an example of the LTE-A mobile station communication capability message (UE-Advanced EUTRAN-Capability) and the transmission and reception apparatus configuration information (UE-RF-Capability) according to the first embodiment. In FIG. 12, a parameter Max-RFRx-Branchs indicates the maximum number I of RF reception branches. Additionally, a parameter Max-BBRx-Branchs indicates the maximum number L of BB demodulation branches. Similarly, a parameter Max-RFTx-Branchs indicates the maximum number J of RF transmission branches. A parameter Max-TxBB-Branchs indicates the maximum number K of BB modulation branches. Additionally, a parameter Max-RE-Bands indicates the maximum frequency band number M. A parameter Max-BBRX-Bands indicates the maximum BB frequency bandwidth number N.

For example, in FIG. 12, RF reception branch configuration information (UE-RFRx-Branchs) and RF transmission branch configuration information (UE-EFTx-Branchs) are substituted in the transmission and reception configuration information (UE-RF-Capability shown in FIG. 12).

In FIG. 12, I RF reception branch configuration informations (UE-RFRX-Branch) are substituted in the RF reception branch configuration information (UE-RFRx-Branchs). L BB demodulation branch configuration informations (UE-BBRx-Branchs) and information (UE-RFRx-Brand-List) of the frequency band number m associated with the i-th RF reception branch are substituted in the i-th RF reception branch configuration information (UE-RFRX-Branch). Information (UE-BBRx-Band-List) of the BB frequency bandwidth number n associated with the l-th BB demodulation branch is substituted in the l-th (small letter of L) BB demodulation branch configuration information (UE-BBRx-Branch).

Here, ue-rfrx-band, that is, the parameter RF_BWm which is lower in hierarchy than the parameter RXi shown in FIG. 11, is substituted in the information (UE-RFRx-Band-List) of the frequency band number m associated with the i-th RF reception branch. Additionally, ue-rxbb-band, that is, the parameter BB_BWn which is lower in hierarchy than the parameter BB_DMl (small letter of L) shown in FIG. 11, is substituted in the information (UE-BBRx-Band-List) of the BB frequency bandwidth number n associated with the l-th BB demodulation branch.

Additionally, in FIG. 12, J RF transmission branch configuration informations (UE-RFTX-Branch) are substituted in the RF transmission branch configuration information (UE-RFTx-Branchs). K BB modulation branch configuration informations (UE-BBTx-Branchs) and information (UE-RFTx-Brand-List) of the frequency band number m associated with the j-th RF transmission branch are substituted in the j-th RF transmission branch configuration information (UE-RFTX-Branch). Information (UE-BBTx-Band-List) of the BB frequency bandwidth number n associated with the k-th BB modulation branch is substituted in the k-th BB modulation branch configuration information (UE-BBTx-Branch).

Here, ue-rftx-band, that is, the parameter RF_BWm which is lower in hierarchy than the parameter TXj shown in FIG. 11, is substituted in the information (UE-RFTx-Band-List) of the frequency band number m associated with the j-th RF transmission branch. Additionally, ue-txbb-band, that is, the parameter BB_BWn which is lower in hierarchy than the parameter BB_MDk shown in FIG. 11, is substituted in the information (UE-BBTx-Band-List) of the BB frequency bandwidth number n associated with the k-th BB modulation branch.

FIG. 13 is a schematic diagram illustrating another example of the LTE-A mobile station communication capability message according to the first embodiment. In FIG. 13, category information (ue-Category shown in FIG. 13) of the LTE-A mobile station apparatus and transmission and reception apparatus configuration information (UE-RF-Capability shown in FIG. 12) are added to the LTE mobile station communication capability message (UE-EUTRAN-Capability) of the related art, thus expressing the LTE-A mobile station communication capability message. The category information of the mobile station apparatus will be explained in a second embodiment.

FIG. 14 is a schematic diagram illustrating an example of the transmission and reception apparatus configuration information according to the first embodiment. FIG. 14 shows that two BB demodulation branches (BB_DM1 and BB_DM2) are included in one RF reception branch (RX1) and that one BB modulation branch (BB_MD1) is included in the one RF transmission branch 1 (TX1).

Additionally, FIG. 14 shows, for example, that the RF reception branch 1 (RX1) can perform reception in the frequency band allocated with the frequency band number "1" (RF_BW1, see FIG. 6). Additionally, for example, FIG. 14 shows that the BB demodulation branch 1 (BB_DM1) included in the RF reception branch 1 can perform the process using the baseband frequency bandwidth allocated with the BB frequency bandwidth number "3" (BB BW3, see FIG. 7).

(Regarding Configuration of Base Station Apparatus B)

Figure 15:
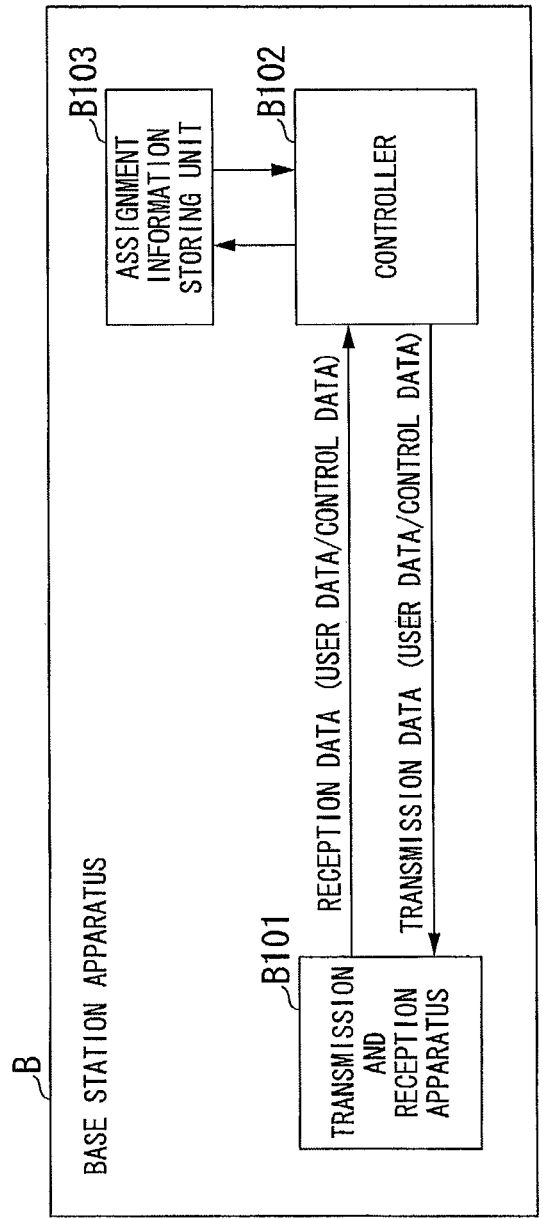
FIG. 15 is a schematic block diagram illustrating a configuration of a base station apparatus according to the first embodiment.

FIG. 15 is a schematic block diagram illustrating a configuration of a base station apparatus B according to the first embodiment. In FIG. 15, the base station apparatus B includes: a transmission and reception apparatus B101; a controller B102; and an assignment information storing unit B103.

The transmission and reception apparatus B101 transmits and receives data to and from the mobile station apparatus A1. The transmission and reception apparatus B101 has the same basic configuration and basic functions as those of the transmission and reception apparatus a3. Therefore, explanations thereof are omitted here.

The controller B102 controls each unit of the base station apparatus B. For example, the controller B102 decodes the RRC message received from the mobile station apparatus A1 to extract transmission and reception apparatus configuration information. Based on the extracted transmission and reception apparatus configuration information, the controller B102 determines assignment of uplink/downlink radio resources to the mobile station apparatus A1.

Additionally, the controller B102 and the assignment information storing unit B103 may be included in an integrated circuit chip. Alternatively, part of the controller B102 and the assignment information storing unit B103 may be included in the transmission and reception apparatus B101.

Alternatively, all of the controller B102 and the assignment information storing unit B103 may be included in the integrated circuit chip. Thus, the configuration is not limited thereto.

For example, if the mobile station apparatus B has communication capability as shown in the case 1 of FIG. 2, and if, regarding frequency assignment or the like, the mobile station apparatus A1 has the transmission and reception apparatus configuration as shown in the case 3 of FIG. 2, the controller B102 decodes, from the RRC message received from the mobile station apparatus A1, the LTE-A mobile station communication capability message (UE-Advanced EUTRAN-Capability shown in FIG. 12) or the LTE mobile station communication capability message (UE-EUTRAN-Capability shown in FIG. 13) to extract the transmission and reception apparatus configuration information (UE-RF-Capability shown in FIG. 12 or 13). Then, the controller B102 performs uplink/downlink CC assignment, that is, assigns the uplink CC having the frequency f1_T1 and the downlink CC having the frequency f1_R1 with respect to the configuration of the mobile station apparatus A1. Then, the controller B102 reports the uplink/downlink CC assignment to the mobile station apparatus A1 at the time of random access or the like. The controller B102 assigns to the downlink CC having the frequency f1_R1, downlink radio resources, in other words, downlink resource blocks RB for the mobile station apparatus A1 to receive mobile station apparatus data. Additionally, the controller B102 assigns to the uplink CC having the frequency f1_T1, uplink radio resources, in other words, downlink resource blocks RB for the mobile station apparatus A1 to transmit mobile station apparatus data.

Additionally, if the base station apparatus B has the transmission and reception apparatus configuration shown in the case 1 of FIG. 2 and has four transmission antennas for the downlink and two reception antennas for the uplink, and if the mobile station apparatus A1 has the transmission and reception apparatus configuration shown in the case 3 of FIG. 2 and has two reception antennas for the downlink (two RF reception branches) and one transmission antenna for the uplink (one RF transmission branch), the controller B102 of the base station apparatus B can perform 2×2 MIMO transmission using the resource blocks RB assigned to the downlink CC having the frequency f1_T1, or assignment of downlink resource blocks RB common to base station apparatuses that perform CoMP communication between the base station apparatuses. In other words, the controller B102 of the base station apparatus B compares the transmission and reception apparatus configuration information received from the mobile station apparatus A1 to the transmission and reception apparatus information of the base station apparatus B, thereby assigning adequate downlink/uplink radio resources to the mobile station apparatus A1 within the base station apparatus communication capability and the mobile station apparatus communication capability.

The controller B102 stores, in the assignment information storing unit B103, the assignment information of the uplink/downlink CCs and assignment information of the radio resources assigned to the uplink/downlink CCs. The controller B102 reads from the assignment information storing unit B103, the assignment information of the uplink/downlink CCs and the assignment information of the radio resources assigned to the uplink/downlink CCs, and thereby controls transmission and reception. Additionally, the controller B102 transmits, to the mobile station apparatus A1 through the transmission and reception apparatus B101, the assignment information of the determined uplink/downlink CCs and the assignment information of the radio resources assigned to the uplink/downlink CCs.

As explained above, according to the first embodiment, the mobile station apparatus A1 transmits, to the base station apparatus B, the mobile station apparatus capability message including the number of BB demodulation branches, the number of BB demodulation branches, and the baseband frequency bandwidth numbers (information relating to a component carrier CC), and the number of RF reception branches, the number of RF transmission branches, and the frequency band numbers (information relating to a frequency band), which can be used for communication with the base station apparatus B. Additionally, the mobile station apparatus A1 communicates with the base station apparatus B using the uplink/downlink radio resources assigned by the base station apparatus B based on the mobile station apparatus capability message. Thereby, in the first embodiment, the communication system can assign uplink/downlink radio resources adequate for communication between the mobile station apparatus A1 and the base station apparatus B.

Additionally, the configuration of the LTE-A mobile station depends on the following elements (a) to (l) (LTE-A technical elements). The LTE-A technical elements include: (a) the number of frequencies; (b) the total number of downlink/uplink CCs; (c) continuous/non-continuous CCs (Intra CA/Inter CA); (d) radio transmission modes; (e) synchronous/asynchronous transmission between downlink CCs or base station apparatuses; (f) various CC bandwidths (for example, 1.4 MHz, 3 MHz, 5 MHz, 10 MHz, 15 MHz, and 20 MHz); (g) the bandwidth of multiple continuous CCs each having the 15 kHz OFDM subcarrier bandwidth (for example, 100 MHz); (h) downlink/uplink MIMO methods; (i) methods of CoMP communication between base station apparatuses; (j) uplink transmission diversity methods; (k) frequency assignment states of mobile telephone service providers; and (l) domestic/international roaming.

Regarding the mobile communication system of the related art, however, various LTE-A technical elements such as the above (a) to (l) have not caused significant effect on the configuration of the mobile station apparatus. For example, in the case of the LTE system, categories of mobile stations (5 types) can be defined by the buffer size of data processing software (maximum downlink data speed 10 Mbps to 300 Mbps) and the maximum MIMO configuration (1×1, 2×2, 4×4). The configuration of a mobile station apparatus can be identified for each category. In other words, 5 types of mobile station apparatuses may be provided for each mobile telephone service provider. In the market, 5 types of mobile station apparatuses may be distributed. Additionally, each mobile telephone service provider may consider services for the 5 types of mobile station apparatuses. However, the LTE-A system is not so simple. If the categories of mobile station apparatuses for the LTE system of the related art are applied to mobile station apparatuses for the LTE-A system, the same configuration cannot be defined for the mobile station apparatuses belong to the same category. In other words, even if mobile station apparatuses belong to the same category, the mobile station apparatuses can have different configurations. For this reason, the adequate performance of the mobile station apparatuses cannot be brought out according to the categories of the mobile station apparatuses. It is difficult to achieve compatibility with various LTE-A technical elements and to achieve a reduction in circuit complexity, lower consumption power, lower cost, miniaturization, an increase in productivity, and the like. On the other hand, it is necessary for a base station apparatus for the LTE-A system to set a limitation to the various LTE-A technical elements in order to reduce the categories of mobile station apparatuses.

According to the first embodiment, mobile station apparatus configuration information is generated with respect to various combinations of LTE-A mobile station apparatus configurations in order to achieve the compatibility with various LTE-A technical elements such as the aforementioned (a) to (l), and the generated mobile station apparatus configuration information is transmitted to the base station apparatus B. Thereby, according to the mobile station apparatus configuration information, the base station apparatus B can bring out adequate performance of the mobile station apparatus A1 compatible with various LTE-A technical elements, thereby assigning adequate uplink/downlink radio resources thereto.

As show in FIGS. 11 and 12, the LTE-A mobile station communication capability message includes radio parameters of the frequency band number RF_BWm and the baseband frequency bandwidth number BB_BWm. However, the LTE-A mobile station communication capability message may include the maximum transmission power level PA_OUTq (q=1, 2, . . . , Q; q is the number allocated to a combination of the maximum transmission power levels), which is a radio parameter of a power amplifier (PA) included in each RF transmission branch number TXj. The radio parameter PA_OUTq has the same level as those of the parameters of the transmission frequency band RF_BWm associated with the RF transmission branch number TXj, and related parameters may be added below RF_BWm of TXj shown in FIG. 11 and below ue-rftx-band shown in FIG. 12. For example, if there are two RF transmission branches, PA_OUTq "1" indicates that the maximum transmission power level of the PA of the RF transmission branch number 1 (TX1) is 23 dBm, and the maximum transmission power level of the PA of the RF transmission branch number 2 (TX2) is 20 dBm. PA_OUTq "2" indicates the reverse. PA_OUTq "3" indicates that both levels are 23 dBm. PA_OUTq "4" indicates that both levels are 20 dBm. If there are J RF transmission branches, a combination of PA_OUTq may be an extension of the above levels.

Additionally, the frequency band number RF_BWm of the radio parameters indicates the relationship among the frequency band numbers, uplink frequency bands, the downlink frequency bands, the frequency bandwidths, and transmission modes, as shown in FIG. 6. However, several continuous uplink frequency bands may be combined to define a new wider uplink frequency band, and several downlink frequency bands may be combined to define a new wider downlink frequency band. For example, the frequency band numbers "1" and "2" shown in FIG. 6 may be combined to define a new frequency band number "1" which is associated with the uplink frequency band of 1930 MHz to 2170 MHz and the downlink frequency band of 1850 MHz to 1980 MHz. Additionally, FIG. 9 shows that one RF reception branch includes multiple BB demodulation branches, and one RF transmission branch includes multiple BB modulation branches. If the frequency bandwidths of the quadrature modulator a15 and the quadrature demodulator a12 are broadband and identical to those of the transmission and reception bands (for example, the bands 11 and 12 shown in FIG. 2) thanks to the progress of the technology, one quadrature modulator and one quadrature demodulator may be used for one set of a radio transmitter and a radio receiver. Alternatively, multiple RF transmission and reception branches, each of which includes a set of a radio transmitter and a radio receiver, a set of a quadrature modulator and a quadrature demodulator, and a set of baseband modulator and a baseband demodulator, may be included after one transmission and reception antenna and one DUP, or after multiple transmission and reception antennas and multiple DUPs.

Second Embodiment

Hereinafter, a second embodiment of the present invention is explained with reference to the drawings.

Explanations are given in the second embodiment with respect to a case where new categories of mobile station apparatuses (hereinafter referred to as LTE-A mobile station categories; mobile station categories) are defined, and a mobile station apparatus capability message including the LTE-A mobile station categories is generated. According to this configuration, the compatibility with various LTE-A technical elements can be achieved in the second embodiment.

A conceptual diagram of a communication system is the same as FIG. 1 of the first embodiment, and therefore explanations thereof are omitted here. Each of the mobile station apparatuses A11 and A12 according to the second embodiment is referred to as a mobile station apparatus A2. Here, the mobile station apparatus A2 includes the transmission and reception apparatus a1 (FIGS. 3 and 4), a2 (FIG. 8), or a3 (FIG. 9), as will be explained later.

Hereinafter, the categories of mobile station apparatuses of the related art (LTE) (referred to as LTE mobile station categories) are explained first, and thereafter categories of mobile station apparatuses of the second embodiment (LTE-A) are explained.

(Regarding LTE Mobile Station Category)

FIG. 16 is a schematic diagram illustrating LTE mobile station category information according to the related art. FIG. 16 shows that there are five LTE mobile station categories (Category 1 to Category 5). Additionally, FIG. 16 shows that the downlink (DL)/uplink (UL) data transmission speed (buffer bit rate) of the mobile station apparatus, a downlink (DL)/uplink (UL) modulation scheme of the mobile station apparatus, and the number of downlink MIMO streams (for example, the number of reception antennas) are determined by the LTE mobile station categories.

FIG. 16 shows, for example, in the case of the LTE mobile station category 5 (Category 5), that the downlink data transmission speed of the mobile station apparatus is "300 Mbps," the uplink data transmission speed thereof is "75 Mbps," the downlink modulation scheme thereof is "QPSK, 16QAM, or 64QAM," the uplink modulation scheme thereof is "QPSK, 16QAM, or 64QAM," and the number of downlink MIMO streams is "4."

With use of the transmission and reception apparatus configuration information explained in the first embodiment, the configuration of the mobile station apparatus belonging to this LTE mobile station category can be expressed as follows.

FIG. 17 is a schematic diagram illustrating an example of transmission and reception apparatus configuration information according to the second embodiment of the present invention. In FIG. 17, the maximum bandwidth of transmission and reception CC is fixed to 20 MHz, and therefore a combination of LTE mobile station apparatuses can be expressed by up to four (i=1, 2, 3, 4) RF reception branches (one RF reception branch includes one BB demodulation branch) and one RF transmission branch (one RF transmission branch includes one BB modulation branch).

(Regarding LTE-A Mobile Station Category)

FIG. 18 is a schematic diagram illustrating an example of LTE-A mobile station category relationship information according to the second embodiment. FIG. 18 shows that there are six LTE-A mobile station categories (Category A to Category F). Additionally, FIG. 18 shows that the downlink (DL)/uplink (UL) data transmission speeds (buffer bit rates) of the mobile station apparatus are determined by the LTE-A mobile station categories. Further, FIG. 18 shows that a range of the number of downlink (DL) MIMO streams, a range of the number of downlink continuous/non-continuous CCs, a range of the number of uplink (UL) MIMO streams, and a range of the number of uplink continuous/non-continuous CCs are determined by the LTE-A mobile station categories.

For example, the data transmission speed in the case of the category B is "100 Mbps" for the downlink and "75 Mbps" for the uplink, and this LTE-A mobile station category is applied to, for example, a mobile station apparatus moving at the high speed. The data transmission speed in the case of the category F is "1000 Mbps" for the downlink and "500 Mbps" for the uplink, and this LTE-A mobile station category is applied to, for example, a mobile station apparatus which is fixed or moving at the very low speed.

Additionally, in FIG. 18, for example, the number of downlink MIMO streams is determined as the range of 8, 4, 2, and 1, and the number of uplink MIMO streams is determined as the range of 4, 2, and 1. In FIG. 18, additionally, the number of downlink CCs is determined as the range of 1 to 5, and the number of uplink CCs is determined as the range of 1 to 2.

In the case of the LTE, the maximum data transmission speed is "75 Mbps" (in the case of 64QAM) for the CC having the bandwidth of 20 MHz in one uplink/downlink MIMO stream (see FIG. 16). Therefore, the number of uplink/downlink MIMO streams and the number of CCs, which are shown in FIG. 18, are in such a relationship as can satisfy the data transmission speed.

For example, in the case of the category B, in order to satisfy the downlink data transmission speed of "100 Mbps," the number of downlink MIMO streams "4" is correlated to the number of downlink CCs "1," the number of downlink MIMO streams "2" is correlated to the number of downlink CCs "1," or the number of downlink MIMO streams "1" is correlated to the number of downlink CCs "2" to "5." For example, if the number of downlink MIMO streams is "4," the maximum downlink transmission speed is 300 Mbps (4 pieces.times.75 Mbps) as long as the number of downlink CCs is "1," thereby satisfying the transmission speed of 100 Mbps. Additionally, for example, if the number of downlink MIMO streams is "1," the maximum downlink transmission speed is 375 Mbps (5 pieces.times.75 Mbps) as long as the number of downlink CCs is "5," thereby satisfying the transmission speed of 100 Mbps.

Further, 16QAM which is a modulation scheme with the low modulation level is selected if the number of downlink MIMO streams is "4" and the number of downlink CCs is "1" (the maximum transmission speed 300 Mbps), thereby satisfying the data transmission speed. Moreover, 64QAM which is a modulation scheme with the high modulation level is selected if the number of downlink MIMO streams is "1" and the number of downlink CCs is "2" (the maximum transmission speed 150 Mbps), thereby satisfying the data transmission speed.

Similarly, in the case of the category B, in order to satisfy the uplink data transmission speed of "75 Mbps," the number of uplink MIMO streams "4" is correlated to the number of uplink CCs "1," the number of uplink MIMO streams "2" is correlated to the number of uplink CCs "1," or the number of uplink MIMO streams "1" is correlated to the number of uplink CCs "1" or "2." For example, if the number of uplink MIMO streams is "2," the maximum uplink transmission speed is 150 Mbps (2 pieces.times.75 Mbps) as long as the number of downlink CCs is "1," thereby satisfying the transmission speed of 75 Mbps. Additionally, for example, if the number of uplink MIMO streams is "1," the maximum uplink transmission speed is 75 Mbps (1 piece.times.75 Mbps) as long as the number of uplink CCs is "1," thereby satisfying the transmission speed of 75 Mbps.

Further, 16QAM which is a modulation scheme with the low modulation level is selected if the number of uplink MIMO streams is "2" and the number of uplink CCs is "1" (the maximum transmission speed 150 Mbps), thereby satisfying the data transmission speed. Moreover, 64QAM which is a modulation scheme with the high modulation level is selected if the number of uplink MIMO streams is "1" and the number of uplink CCs is "1" (the maximum transmission speed 75 Mbps), thereby satisfying the data transmission speed.

The LTE-A mobile station categories (Category shown in FIG. 18) of the present invention are characterized by being correlated to the number of downlink CCs, in other words, by being managed by the number of downlink CCs.

The LTE-A mobile station categories of the present invention are not limited to the example shown in FIG. 18, as long as the number of downlink MIMO streams is correlated to the number of downlink CCs according to the maximum data transmission speed, so as to satisfy the maximum data transmission speed. Additionally, the number of LTE-A mobile station categories is not limited to the example shown in FIG. 18 (six), and may be greater or smaller than that of the example. Further, the category 1 of the LTE mobile station categories is included in the category A of the LTE-A mobile station categories.

(Limitation of Configuration of LTE-A Mobile Station Apparatus)

Regarding the configurations of the RF transmission branch and the BB modulation branch of the LTE-A mobile station apparatus, the SC (Single Carrier)-FDMA transmission scheme is suitable if backward compatibility with the LTE system and PAPR (Peak to Average Power Ratio) of RF transmission signals, which affects the power amplifier PA included in the radio transmitter a16, are in consideration. If the number of uplink continuous/non-continuous CCs is limited to two, the configuration of the LTE-A mobile station apparatus can be considered to include two RF transmission branches (one RF transmission branch includes one BB modulation branch having up to 40 MHz baseband frequency bandwidth).

Additionally, regarding frequency bands, there are various demands from mobile telephone service providers, and there is a tendency to limit the number of frequency bands to up to three according to the configuration of a mobile station apparatus. For example, even if the frequency band numbers are limited to the frequency band numbers 3, 1, and 7 in the FDD mode (see FIG. 6) or the frequency band numbers 34, 29, and 40 in the TDD mode (see FIG. 6), and if the number of downlink MIMO streams is eight (eight reception antennas), the number of RF reception branches becomes 24, and therefore the hardware configuration, the size, and the consumption power of the mobile station apparatus are significantly problematic. If LTE-A mobile stations are categorized according to the number of frequency bands, a category of an upper-class mobile station (such as a 1000 Mbps class mobile station apparatus) is the maximum configuration (High End Product) of mobile station apparatuses. It is impossible to satisfy demands of users, for example, to provide a low-cost mobile station apparatus that belongs to the 1000 Mbps class and operates at 3.5 GHz (frequency band number A). For this reason, the LTE-A mobile station categories shown in FIG. 18 are defined irrespective of radio parameters of downlink frequency bands.

Similarly, the number of RF transmission branches depends on the number of uplink frequency bands. For example, if the number of frequency bands is three and the number of uplink MIMO streams is four (four transmission antennas), the number of RF transmission branches becomes twelve. If LTE-A mobile stations are categorized according to the number of frequency bands, an upper-class category (such as a 500 Mbps class mobile station apparatus) becomes the maximum configuration of the mobile station apparatuses. It is impossible to satisfy demands of users, for example, to provide a low-cost mobile station apparatus that belongs to the 500 Mbps class and operates at 3.5 GHz (frequency band number A). For this reason, the LTE-A mobile station categories shown in FIG. 18 are defined irrespective of radio parameters of uplink frequency bands.

Hereinafter, LTE-A mobile station categories suitable to a case where there are multiple frequency bands are explained. If there are multiple frequency bands, and if the RF reception branch and the RF transmission branch which are compatible with one MIMO stream are configured to be compatible with multiple frequency bands, the following LTE-A mobile station categories (FIG. 19) are used.

FIG. 19 is a schematic diagram illustrating another example of LTE-A mobile station category relationship information according to the second embodiment. FIG. 19 is obtained by changing the number of uplink/downlink MIMO streams (UL/DL Number of MIMO streams to the number of uplink/downlink data streams (UL/DL Number of DATA streams).

FIG. 19 shows that there are six LTE-A mobile station categories (Categories A to F). Additionally, FIG. 19 shows that the downlink (DL)/uplink (UP) data transmission speeds (buffer bit rates) are determined by the LTE-A mobile station categories. Further, FIG. 19 shows that a range of the number of downlink (DL) data streams (Number of DATA Streams), a range of the number of downlink continuous/non-continuous CCs (Number of CCs), a range of the number of uplink (UL) data streams, and a range of the number of uplink continuous/non-continuous CCs are determined by the LTE mobile station categories.

The definition of the number of uplink/downlink data streams is the extension of the number of uplink/downlink MIMO streams. Within the same frequency band, the number of uplink/downlink data streams is the same as the number of uplink/downlink MIMO streams. In the case of the different frequency bands, the number of uplink/downlink data streams is the total of the number of uplink and downlink MIMO streams for each frequency band. In other words, similar downlink data transmission speeds of mobile station apparatuses can be achieved in the following two cases: the case of the same frequency band where the number of downlink MIMO streams is "2" (2.times.2 MIMO) and the number of downlink CCs is "1"; and the case of two frequency bands where the number of downlink data streams is "2" and the number of downlink CCs is "1."

For example, the data transmission speed in the case of the category B is "100 Mbps" for the downlink and "75 Mbps" for the uplink, and this LTE-A mobile station category is applied to, for example, a mobile station apparatus moving at the high speed. The data transmission speed in the case of the category F is "1000 Mbps" for the downlink and "500 Mbps" for the uplink, and this LTE-A mobile station category is applied to, for example, a mobile station apparatus which is fixed or moving at the very low speed.

Additionally, in FIG. 19, for example, the number of downlink data streams is determined as the range of 8, 4, 2, and 1, and the number of uplink data streams is determined as the range of 4, 2, and 1. In FIG. 19, additionally, the number of downlink CCs is determined as the range of 1 to 5, and the number of uplink CCs is determined as the range of 1 to 2.

In the case of LTE, the maximum data transmission speed is "75 Mbps" (in the case of 64QAM) for the CC having the 20 MHz bandwidth in one uplink/downlink data stream (see FIG. 16). Therefore, the number of uplink/downlink data streams and the number of CCs, which are shown in FIG. 19, are in such a relationship as can satisfy the data transmission speed.

For example, in the case of the category B, in order to satisfy the downlink data transmission speed of "100 Mbps," the number of downlink data streams "4" is correlated to the number of downlink CCs "1," the number of downlink data streams "2" is correlated to the number of downlink CCs "1," or the number of data MIMO streams "1" is correlated to the number of downlink CCs "2" to "5." For example, if the number of downlink data streams is "4," the maximum downlink transmission speed is 300 Mbps (4 pieces×75 Mbps) as long as the number of downlink CCs is "1," thereby satisfying the transmission speed of 100 Mbps. Additionally, for example, if the number of downlink data streams is "1," the maximum downlink transmission speed is 375 Mbps (5 pieces×75 Mbps) as long as the number of downlink CCs is "5," thereby satisfying the transmission speed of 100 Mbps.

Further, 16QAM which is a modulation scheme with the low modulation level is selected if the number of downlink data streams is "4" and the number of downlink CCs is "1" (the maximum transmission speed 300 Mbps), thereby satisfying the data transmission speed. Moreover, 64QAM which is a modulation scheme with the high modulation level is selected if the number of downlink data streams is "1" and the number of downlink CCs is "2" (the maximum transmission speed 150 Mbps), thereby satisfying the data transmission speed. Similar explanations apply to the uplink.

The LTE-A mobile station categories (Category shown in FIG. 19) of the present invention are characterized by being correlated to the number of data streams, in other words, by being managed by the number of data streams.

The LTE-A mobile station categories of the present invention are not limited to the example shown in FIG. 19, as long as the number of downlink data streams is correlated to the number of downlink CCs according to the maximum data transmission speed, so as to satisfy the maximum data transmission speed, as explained above. Additionally, the number of LTE-A mobile station categories is not limited to the example shown in FIG. 19 (six), and may be greater or smaller than that of the example. Further, the category 1 of the LTE mobile station categories is included in the category A of the LTE-A mobile station categories.

Modified Example 1

Regarding the LTE-A mobile station category relationship information of the present invention, the number of combinations of the number of data streams and the number of continuous/non-continuous CCs may be decreased. For example, the number of combinations including the number of data stream "1" may be decreased as shown in FIG. 20.

FIG. 20 is a schematic diagram illustrating an example of LTE-A mobile station category relationship information according to the modified example 1 of the second embodiment. If the LTE-A mobile station categories shown in FIG. 20 is compared to the LTE-A mobile station categories shown in FIG. 19, the difference is that the combinations of the number of data streams "1" and the number of continuous/non-continuous CCs are deleted for the downlink (DL)/uplink (UL) in the case of category B and for the downlink in the case of the category C, which are shown in FIG. 20.

Modified Example 2

Additionally, the BB frequency bandwidth of the BB demodulation branch of the actual mobile station apparatus A2 (FIG. 7) is the minimum 20 MHz. Therefore, regarding the mobile station apparatus A2, for example, the BB frequency bandwidth may be switched between 20 MHz and 40 MHz using the digital filter a133 and the FFT unit a136 for limiting reception bands shown in FIG. 3, thereby switching between one logical CC and two logical CCs to perform reception. Here, the logical CC indicates one CC having the 20 MHz bandwidth. Further, in this case, the BB frequency bandwidth is referred to as a physical CC. The same concept applies to the uplink.

If the BB frequency bandwidth is limited to up to two uplink/downlink continuous logical CCs, that is, up to 40 MHz in consideration of a test case of the mobile station apparatus, the LTE-A mobile station category becomes as shown in FIG. 21.

FIG. 21 is a schematic diagram illustrating an example of LTE-A mobile station category relationship information according to a modified example 2 of the second embodiment. If the LTE-A mobile station category relationship information shown in FIG. 21 is compared to the LTE-A mobile station category relationship information shown in FIG. 20, the difference is that in the case of FIG. 21, the combinations of the number of data streams and the number of continuous/non-continuous CCs (Number of CC) "5" are deleted for downlink (DL) of the categories D, E, and F.

Modified Example 3

Additionally, as shown in FIG. 21, the number of combinations of the number of data streams and the number of continuous/non-continuous CCs is decreased compared to FIG. 20. However, the configuration of a mobile station apparatus cannot be perfectly identified by the LTE-A mobile station category shown in FIG. 21. For example, for the LTE-A mobile station categories B to F, it cannot be determined whether or not the frequency bands correlated to the number of the data streams "2" are identical. Further limitation is needed. For example, the frequency band is limited to the same frequency band as shown in FIG. 22, thus making the number of combinations of the number of data streams and the number of continuous/non-continuous CCs being one for each LTE-A mobile station category.

(Regarding Configuration of Mobile Station Apparatus A2)

Figure 23:
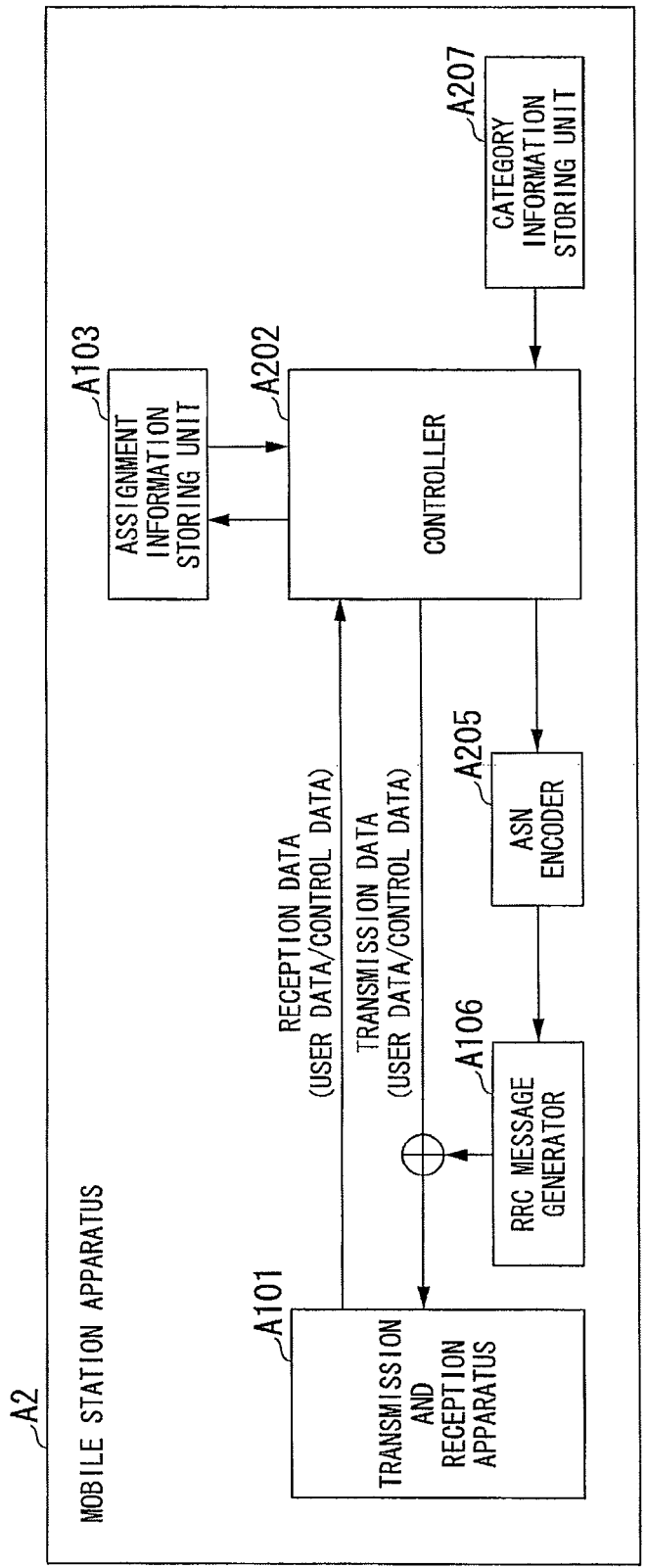
FIG. 23 is a schematic block diagram illustrating a configuration of a mobile station apparatus according to the second embodiment.

FIG. 23 is a schematic block diagram illustrating a configuration of the mobile station apparatus A2 according to the second embodiment. If the mobile station apparatus A2 according to the second embodiment (FIG. 23) is compared to the mobile station apparatus A1 according to the first embodiment (FIG. 10), a controller A202, an ASN encoder A205, and category information storing unit A207 differ. However, other constituent elements (the transmission and reception apparatus A101, the assignment information storing unit A103, and the RRC message generator A106) have the same functions as those of the first embodiment. Explanations of the same functions as those of the first embodiment are omitted here.

The category information storing unit A207 stores in a memory, LTE-A mobile station category information (Categories shown in FIGS. 18 to 22), that is, the reference numerals A to F associated with the LTE-A mobile station categories A to F, integers 1 to 6, or information of 3 bits. The LTE-A mobile station category information can be previously set at the time of factory shipment, sale, or initial use of a user, according to the mobile station apparatus configuration, and be written in the category information storing unit A207. Additionally, the LTE-A mobile station category information can be associated with mobile station apparatus individual information, such as the body identification number, the serial number, or the manufacturing number of a mobile station apparatus. For example, FIG. 14 shows that one RF reception branch (RX1) includes two BB demodulation branches (BB_DM1, BB_DM2), and one RF transmission branch 1 (TX1) includes one BB modulation branch (BB_MDl). Therefore, with respect to FIG. 21, the information of the LTE-A mobile station category B is written in the category information storing unit A207. Additionally, with respect to FIG. 22, the information of the LTE-A mobile station category A is written in the category information storing unit A207.

The controller A202 controls each unit of the mobile station apparatus A2. For example, the controller A202 receives uplink/downlink radio resource information assigned by the base station apparatus B, and stores the received radio resource information in the assignment information storing unit A103. The controller A202 reads the radio resource information from the assignment information storing unit A103, and controls transmission and reception. Additionally, the controller A202 outputs, to the ASN encoder A205, the LTE-A mobile station category information stored in the category information storing unit A207.

The ASN encoder A205 converts the LTE-A mobile station category information received from the controller A202 into abstract syntax notation 1 (ASN. 1) to perform encoding, and outputs the encoded information to the RRC message generator A106. The details of the process performed by the ASN encoder A205 will be explained later with the RRC message generation process.

The RRC message generator A106 generates an LTE-A mobile station communication capability message (UE-Advanced EUTRA-Capability) including the information received from the ASN encoder A105. Then, the RRC message generator A106 outputs the LTE-A mobile station communication capability message to the transmission and reception apparatus A101 as part of an RRC message included in control data. The details of the process performed by the RRC message generator A106 will be explained later with the RRC message generation process.

The transmission and reception apparatus A101 processes, by the RF transmission branch j, the RRC message received from the RRC message generator A106, and transmits the processed message to the base station apparatus B.

Additionally, the assignment information storing unit A103, the RRC message generator A106, the controller A202, the ASN encoder A205, and the category information storing unit A207 may be included in an integrated circuit chip. Alternatively, part of these units may be included in the transmission and reception apparatus A101, or all of these units may be included in an integrated circuit chip. The configuration is not limited.

(Regarding RRC Message Generation Process)

Hereinafter, the RRC message generation process performed by the ASN encoder A205 and the RRC message generator A106 is explained.

FIG. 24 is a schematic diagram illustrating an example of LTE-A mobile station category information (ue-Category shown in FIG. 24) included in the LTE-A mobile station communication capability message (UE-Advanced EUTRA-Capability shown in FIG. 24) converted into the abstract syntax notation 1 according to the second embodiment. In FIG. 24, values "1" to "6" (INTEGER (1 . . . 6)) of the mobile station category information (ue-Category) indicate the LTE-A mobile station categories A to F (see FIGS. 18 to 21), respectively. With respect to FIG. 22, values of the mobile station category information (ue-Category) are "1" to "4" (INTEGER (1 . . . 4)), respectively.

Regarding the base station apparatus B, the controller B assigns uplink/downlink radio resources based on the mobile station category information as shown in FIG. 22 (see FIG. 15). For example, the controller B102 decodes the LTE-A mobile station communication message (UE-Advanced EUTRAN-Capability shown in FIG. 24) from the RRC message received from the mobile station apparatus A2 to extract mobile station category information (ue-Category shown in FIG. 24). Based on the mobile station category information, the controller B202 determines assignment of uplink/downlink local CCs to the mobile station apparatus A2 and assignment of radio resources in each of the assigned uplink/downlink local CCs.

For example, if the base station apparatus B has such communication capability as can achieve the compatibility with the LTE-A mobile station category C, that is, such communication capability that the base station apparatus B can perform, in the frequency band 1 (2 GHz shown in FIG. 2), transmission of f1_R1 to f1_R4 of the downlink local CCs and reception of f1_T1 to f1_T4 of the uplink local CC, while the mobile station apparatus A2 has such a transmission and reception apparatus configuration as that of the LTE-A mobile station category A, that is, such a configuration that the mobile station apparatus A2 can perform, in the frequency band 1 (2 GHz shown in FIG. 2), reception of f1_R1 and f1_R2 of the downlink local CCs and transmission of f1_T1 of the uplink CC, the controller B102 assigns to the mobile station apparatus A2, uplink/downlink local CCs, that are, f1_R1 and f1_R2 of the downlink local CCs and f1_T1 of the uplink local CC, and reports the assignment at the time of the initial access by the mobile station apparatus A2. The controller B102 assigns to the downlink local CCs having the frequencies f1_R1 and f1_R2, downlink radio resources, that are, downlink resource blocks RB for the mobile station apparatus A2 to receive mobile station apparatus data. Further, the controller B102 assigns to the uplink local CC having the frequency f1_T1, uplink radio resources, that are, uplink resource blocks RB for the mobile station apparatus A2 to transmit mobile station apparatus data. The controller B102 of the base station apparatus B compares the mobile station apparatus category information (ue-Category shown in FIG. 24) from the mobile station apparatus A2 to the transmission and reception apparatus configuration information of the base station apparatus B, and thereby can assign adequate downlink/uplink radio resources to the mobile station device A2 within the communication capabilities of the base station apparatus and the mobile station apparatus. The frequency band information with which the mobile station apparatus A2 is compatible, such as the frequency band number, can be reported to the base station apparatus B through another RRC message, as in the case of the related art.

The controller B102 stores, in the assignment information storing unit B103, the assignment information of the determined uplink/downlink local CCs, and the assignment information of the radio resources assigned to the uplink/downlink local CCs. The controller B102 reads, from the assignment information storing unit B103, the assignment information of the determined uplink/downlink local CC, and the assignment information of the radio resources assigned to uplink/downlink local CC, and thereby controls transmission and reception. Additionally, the controller B102 transmits, to the mobile station apparatus A2 through the transmission and reception apparatus B102, the assignment information of the determined uplink/downlink local CC, and the assignment information of the radio resources assigned to the uplink/downlink local CCs.

As explained above, according to the second embodiment, the mobile station apparatus A2 transmits, to the base station apparatus B, the LTE-A mobile station category information (ue-Category shown in FIG. 24) that can be used for communication with the base station apparatus B. Additionally, the mobile station apparatus A2 communicates with the base station apparatus B using the uplink/downlink radio resources assigned by the base station apparatus B based on the LTE-A mobile station category information. Thereby, the communication system of the second embodiment can assign uplink/downlink radio resources adequate for communication between the mobile station apparatus A2 and the base station apparatus B.

Modified Example

FIG. 25 is a schematic diagram illustrating another example of the LTE-A mobile station category information converted into the abstract syntax notation 1 according to a modified example 3 of the second embodiment. In FIG. 25, among the values "1" to "11" (INTEGER (1 . . . 11)) of the mobile station apparatus category information (ue-Category shown in FIG. 25) included in the LTE mobile station communication capability message (UE-EUTRAN-Capability) of the related art, the values of "1" to "5" indicate the LTE mobile station categories 1 to 5 of the related art, respectively. The values "6" to "11" respectively indicating the LTE-A mobile station categories A to F are added thereto, thus expressing the LTE-A mobile station capability message.

As explained above, according to the second embodiment, the mobile station apparatus A2 transmits, to the base station apparatus B, the LTE-A mobile station category information (ue-Category shown in FIG. 24 or 25) that can be used for communication with the base station apparatus B. Additionally, the mobile station apparatus A2 communicates with the base station apparatus B using the uplink/downlink radio resources assigned by the base station apparatus B based on the LTE-A mobile station category information. Thereby, the communication system of the second embodiment can assign uplink/downlink radio resources adequate for communication between the mobile station apparatus A2 and the base station apparatus B.

The second embodiment is the same as the related art with respect to the configuration that the LTE-A mobile station category information (ue-Category shown in FIG. 24 or 25) is defined, and the mobile station category information is transmitted to the base station apparatus. However, the LTE-A mobile station categories are managed by the number of data streams and the number of local CCs. Thereby, the base station apparatus can assign adequate downlink/uplink radio resources to the mobile station apparatus within the communication capabilities of the base station apparatus and the mobile station apparatus, as in the case of the related art.

In the first embodiment, mobile station apparatus configuration information is generated with respect to a combination of LTE-A mobile station apparatus configurations in order to achieve the compatibility with various LTE-A technical elements such as the above (a) to (l), and the generated mobile station apparatus configuration information is transmitted to the base station apparatus B. Thereby, the base station apparatus B can perform, according to the mobile station apparatus configuration information, assignment of adequate uplink/downlink radio resources that can bring out the adequate performance of the mobile station apparatus A1 compatible with various LTE-A technical elements. In contrast to the above feature of the first embodiment, in the second embodiment, the LTE-A mobile station categories are defined according to the number of data streams and the number or logical CCs, thereby adding limitation to the combinations of the LTE-A mobile station apparatus configurations. For this reason, limitation is added to the compatibility with various LTE-A technical elements. However, the information amount of the RRC message including the LTE-A mobile station categories A to F (see FIGS. 19 to 22) (such as the number of bits, the information amount of uplink signaling control signals, or overhead of radio resources) can be reduced. The limitation to the combinations of the LTE-A mobile station apparatus configurations can achieve a reduction in circuit complicity, lower power consumption, lower cost, miniaturization, an increase in productivity, and the like.

Third Embodiment

Hereinafter, a third embodiment of the present invention is explained in detail with reference to the drawings.

In the third embodiment, a mobile station apparatus generates an LTE-A mobile station communication capability message including the transmission and reception apparatus configuration information (UE-RF-Capability) according to the first embodiment and the mobile station category information (ue-Category) according to the second embodiment.

A conceptual diagram of a communication system is the same as FIG. 1 of the first embodiment, and therefore explanations thereof are omitted here. Each of the mobile station apparatuses A11 and A12 according to the third embodiment is referred to as a mobile station apparatus A3.

(Regarding Configuration of Mobile Station Apparatus A3)

Figure 26:
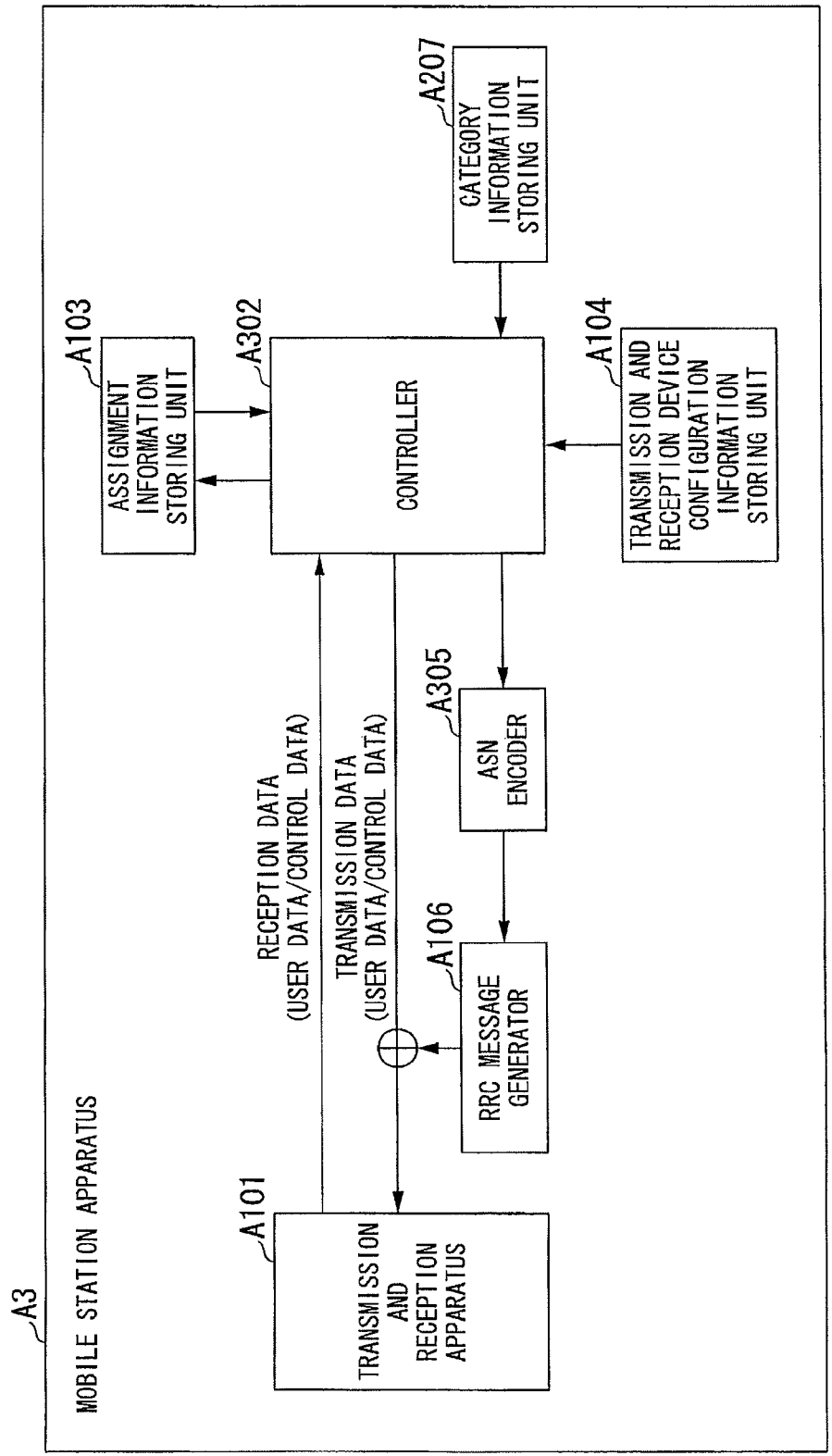
FIG. 26 is a schematic block diagram illustrating a configuration of a mobile station apparatus according to a third embodiment of the present invention.

FIG. 26 is a schematic block diagram illustrating a configuration of the mobile station apparatus A3 according to the third embodiment. If the mobile station apparatus A3 according to the third embodiment (FIG. 26) is compared to the mobile station apparatus A1 according to the first embodiment (FIG. 10), a controller A302 and an ASN encoder A305 differ. However, other constituent elements (the transmission and reception apparatus A101, the assignment information storing unit A103, the RRC message generator A106, the category information storing unit A207, and the transmission and reception apparatus information storing unit A104) have the same functions as those of the first and second embodiments. Explanations of the same functions as those of the first and second embodiments are omitted here.

The controller A302 controls each unit of the mobile station apparatus A3. For example, the controller A302 receives radio resource information assigned by the base station apparatus B, and stores the received radio resource information in the assignment information storing unit A103. The controller A302 reads the radio resource information from the assignment information storing unit A103, and controls transmission and reception.

Additionally, the controller A302 outputs, to the ASN encoder A205, the transmission and reception apparatus configuration information stored in the transmission and reception apparatus configuration information storing unit A104, and the LTE-A mobile station category information read from the category information storing unit A207.

The ASN encoder A305 converts the LTE-A mobile station category information received from the controller A302 into abstract syntax notation 1 (ASN. 1) to perform encoding, and outputs the encoded information to the RRC message generator A106. The details of the process performed by the RRC message generator A106 will be explained later with the RRC message generation process. The transmission and reception apparatus A101 processes, by the RF transmission branch j, the RRC message received from the RRC message generator A106, and transmits the processed RRC message to the base station apparatus B.

Additionally, the assignment information storing unit A103, the transmission and reception apparatus configuration information storing unit A104, the RRC message generator A106, the controller A302, the ASN encoder A305, and the category information storing unit A207 may be included in an integrated circuit chip. Alternatively, part of these units may be included in the transmission and reception apparatus A101, or all of these units may be included in an integrated circuit chip. Thus, the configuration is not limited.

(Regarding RRC Message Generation Process)

Hereinafter, the RRC message generation process performed by the ASN encoder A305 and the RRC message generator A106 is explained.

FIG. 27 is a schematic diagram illustrating an example of the LTE-A mobile station communication capability message. In FIG. 27, the LTE-A mobile station communication capability message (UE-Advanced EUTRA-Capability shown in FIG. 27) includes mobile station category information (ue-Category shown in FIG. 24) and transmission and reception apparatus configuration information (UE-RF-Capability shown in FIG. 12).

Additionally, in FIG. 27, values "1" to "6" (INTEGER (1 . . . 6)) of the mobile station category information (ue-Category shown in FIG. 27) indicate the LTE-A mobile station categories A to F (see FIGS. 18 to 21), respectively. Similarly, values of the mobile station category information (ue-Category), such as "1" to "4" (INTEGER (1 . . . 4)) in the case of FIG. 22, and "1" to "11" (INTEGER (1 . . . 11)) in the case of FIG. 25, indicate mobile station categories.

Regarding the base station apparatus B, the controller B102 assigns uplink/downlink radio resources based on mobile station category information as shown in FIG. 21 and the transmission and reception apparatus configuration information (see FIG. 15). For example, the controller B102 decodes and extracts mobile station category information (ue-Category shown in FIG. 27) and transmission and reception apparatus configuration information (UE-RF-Capability shown in FIG. 12) from the RRC message received from the mobile station apparatus A3. Based on the mobile station category information and the transmission and reception apparatus configuration information which are extracted, the controller B302 determines assignment of uplink/downlink radio resources to the mobile station apparatus A3.

For example, the controller B102 extracts the LTE-A mobile station category B from the mobile station category information, and extracts a radio parameter of the mobile station apparatus configuration as shown in FIG. 28 from the transmission and reception apparatus configuration information. The buffer size of uplink/downlink data processing software of the mobile station apparatus A3 (the maximum downlink data speed 100 Mbps, the maximum uplink data speed 75 Mbps) can be determined by the LTE-A mobile station apparatus category B. Additionally, it can be determined by the radio parameter shown in FIG. 28 that the mobile station apparatus A3 has such a configuration that two BB demodulation branches (BB_DM1, BB_DM2) are included in one RF reception branch (RX1) in the frequency band 1 (FIG. 2, 2 GHz, the frequency band number 1), and that one BB modulation branch (BB_MD1) is included in one RF transmission branch 1 (TX1).

If the base station apparatus B has such communication capability as can achieve the compatibility with the LTE-A mobile station category C, that is, such communication capability that the base station apparatus B can perform, in the frequency band 1 (FIG. 2, 2 GHz, the frequency band number 1), transmission of f1_R1 to f1_R4 of the downlink local CCs and reception of f1_T1 to f1_T4 of the uplink local CCs, the controller B102 assigns uplink/downlink local CCs to the mobile station apparatus A3, and reports the assignment to the mobile station apparatus A3 at the time of the initial access by the mobile station apparatus A3. For the downlink, since the mobile station apparatus A3 has configuration such that two demodulation branches are included in one RF reception branch with respect to the frequency band 1, the controller B102 assigns to the mobile station apparatus A2, for example, f1_R1 and f1_R2 of continuous downlink local CCs, or f1_R1 and f1_R4 of non-continuous downlink local CCs, in consideration of user load in the downlink, that is, the load balance of f1_R1 to f1_R4 of the downlink local CCs. For the uplink, since the mobile station apparatus A3 has such a configuration that one BB demodulation branch is included in one RF transmission branch with respect to the frequency band 1, the controller B102 assigns, for example, f1_R2 of the uplink local CC to the mobile station apparatus A3 in consideration of user load in the uplink, that is, the load balance of f1_T1 to f1_T4 of the uplink local CCs (if there is compatibility with multiple uplink local CCs, continuous/non-continuous CCs can be assigned similarly to the downlink).

For example, in the case of continuous downlink local CCs, the controller B302 assigns to the downlink local CCs having the frequencies f1_R1 and f1_R2, downlink radio resources, that are, downlink resource blocks RB for the mobile station apparatus A3 to receive mobile station apparatus data. Further, the controller B302 assigns to the uplink local CC having the frequency f1_T1, uplink radio resources, that are, uplink resource blocks RB for the mobile station apparatus A2 to transmit mobile station apparatus data. The controller B102 compares the mobile station apparatus category information and the transmission and reception apparatus configuration information from the mobile station apparatus A3 to the transmission and reception apparatus configuration information of the base station apparatus B, and thereby can assign adequate downlink/uplink radio resources to the mobile station device A3 within the communication capabilities of the base station apparatus and the mobile station apparatus.

Additionally, for example, the controller B102 extracts the LTE-A mobile station category B from the mobile station category information, and extracts a radio parameter of the mobile station apparatus configuration as shown in FIG. 29 from the transmission and reception apparatus configuration information. The buffer size of uplink/downlink data processing software of the mobile station apparatus A3 (the maximum downlink data speed 100 Mbps, the maximum uplink data speed 75 Mbps) can be determined by the LTE-A mobile station apparatus category B. Additionally, it can be determined by the radio parameter shown in FIG. 29 that the mobile station apparatus A3 has such a configuration that one BB demodulation branch (BB_DM1) is included in one RF reception branch (RX1) with respect to the frequency band 1 (FIG. 2, 2 GHz, the frequency band number 1), that one BB demodulation branch (BB_DM2) is included in one RF reception branch (RX2) with respect to the frequency band 2 (FIG. 2, 3 GHz, the frequency band number A), and that one BB modulation branch (BB_MDl) is included in the RF transmission branch 1 (TX1) with respect to the frequency band 1 (FIG. 2, 2 GHz, the frequency band number 1).

If the base station apparatus B has such communication capability as can achieve the compatibility with the LTE-A mobile station category C, that is, such communication capability that the base station apparatus B can perform, in the frequency band 1 (FIG. 2, 2 GHz, the frequency band number 1), transmission of f1_R1 to f1_R4 of the downlink local CCs and reception of f1_T1 to f1_T4 of the uplink local CCs, the controller B102 assigns uplink/downlink local CCs to the mobile station apparatus A3, and reports the assignment at the time of the initial access by the mobile station apparatus A3. For the downlink, since the mobile station apparatus A3 has such a configuration that one demodulation branch is included in one RF reception branch with respect to the frequency band 1, the controller B102 assigns to the mobile station apparatus A3, for example, f1_R2 of the downlink local CC in consideration of user load in the downlink, that is, the load balance of f1_R1 to f1_R4 of the downlink local CCs (if there are multiple downlink local CCs, continuous/non-continuous CCs can be assigned). For the uplink, since the mobile station apparatus A3 has such a configuration that one BB demodulation branch is included in one RF transmission branch with respect to the frequency band 1, the controller B102 assigns, for example, f1_T2 of the uplink local CC to the mobile station apparatus A3 in consideration of user load in the uplink, that is, the load balance of f1_T1 to f1_T4 of the uplink local CC (if there is compatibility with multiple uplink local CCs, continuous/non-continuous CCs can be assigned similarly to the downlink).

In the case of continuous downlink local CCs, the controller B302 assigns to the downlink local CC having the frequency f1_R2, a downlink radio resource, that is, a downlink resource block RB for the mobile station apparatus A3 to receive mobile station apparatus data. Further, the controller B302 assigns to the uplink local CC having the frequency f1_T2, an uplink radio resource, that is, an uplink resource block RB for the mobile station apparatus A3 to transmit mobile station apparatus data. The controller B102 compares the mobile station apparatus category information and the transmission and reception apparatus configuration information from the mobile station apparatus A3 to the transmission and reception apparatus configuration information of the base station apparatus B, and thereby can assign adequate downlink/uplink radio resources to the mobile station device A3 within the communication capabilities of the base station apparatus and the mobile station apparatus.

The controller B102 stores, in the assignment information storing unit B103, assignment information of the uplink/downlink local CC, and assignment information of the radio resource assigned to the uplink/downlink local CC. The controller B102 reads, from the assignment information storing unit B103, the assignment information of the uplink/downlink local CC, and the assignment information of the radio resource assigned to the assigned uplink/downlink local CC, and thereby controls transmission and reception. Additionally, the controller B102 transmits, to the mobile station apparatus A2 through the transmission and reception apparatus B101, the assignment information of the determined uplink/downlink local CC, and the assignment information of the radio resource assigned to the uplink/downlink local CC.

As explained above, according to the third embodiment, the mobile station apparatus A3 transmits, to the base station apparatus B, the LTE-A mobile station category information and the transmission and reception apparatus configuration information which are included in the LTE-A mobile station communication capability message (UE-Advanced EUTRAN-Capability shown in FIG. 27) that can be used for communication with the base station apparatus B. Additionally, the mobile station apparatus A3 communicates with the base station apparatus B using the uplink/downlink radio resources assigned by the base station apparatus B based on the LTE-A mobile station category information and the transmission and reception apparatus configuration information. Thereby, the communication system of the third embodiment can assign uplink/downlink radio resources adequate for communication between the mobile station apparatus A3 and the base station apparatus B.

Modified Example

As shown in FIGS. 19 to 21, combinations of the number of uplink/downlink streams and the number of uplink/downlink local CCs are similar in part among LTE-A mobile station categories. If combinations of the number of uplink/downlink streams and the number of uplink/downlink local CCs differ among LTE-A mobile station categories as shown in FIG. 22, the mobile station apparatus A3 may transmit only LTE-A mobile station category information to the base station apparatus B, as in the second embodiment. Alternatively, the mobile station apparatus A3 may transmit, to the base station apparatus B, only transmission and reception apparatus configuration information of the mobile station apparatus A3 which includes the LTE-A mobile station category information shown in FIG. 21. The base station apparatus B can determine the LTE-A mobile station category information from the transmission and reception apparatus configuration information of the mobile station apparatus A3.

In contract to the second embodiment where the limitations are added to the combinations of LTE-A mobile station apparatus configurations by means of the definition of the LTE-A mobile station category information, in the third embodiment, the limited transmission and reception apparatus configuration information which is limited to the LTE-A mobile category information is added thereto, thereby relaxing the limitation to various LTE-A technical elements such as the above (a) to (l), compared to the second embodiment. However, the information amount of the RRC message including information of LTE-A mobile station categories A to F (see FIGS. 19 to 21) and the transmission and reception apparatus configuration information (such as the number of bits, the information amount of uplink signaling control signals, or overhead of radio resources) is increased compared to the second embodiment, but is smaller than in the first embodiment.

Fourth Embodiment

Hereinafter, a fourth embodiment of the present invention is explained in detail with respect to the drawings.

An example of six LTE-A mobile station categories A to F has been shown in the second embodiment (FIGS. 18 to 21). For example, the example of FIG. 19 is a case where the numbers of downlink data streams are "8," "4," "2," and "1," the numbers of uplink data streams are "4," "2," and "1," the frequency bandwidth of one CC is 20 MHz, the maximum number of downlink continuous/non-continuous CCs is "5," and the maximum number of uplink continuous/non-continuous CCs is "2." Even in this case, there are multiple combinations of the number of data streams and the number of CCs. For example, in the case of FIG. 19, there are 24 types including the combinations of the number of downlink/uplink data streams and the number of CCs.

In the fourth embodiment, a mobile station apparatus generates an LTE-A mobile station communication capability message including the mobile station category information (ue-Category shown in FIG. 24) according to the second embodiment, and the transmission and the reception apparatus configuration number (also referred to as abbreviated transmission and reception apparatus configuration information; identification information) that identifies this combination.

A conceptual diagram of a communication system is the same as FIG. 1 of the third embodiment, and therefore explanations thereof are omitted here. Each of the mobile station apparatuses A11 and A12 according to the fourth embodiment is referred to as a mobile station apparatus A4.

(Regarding Transmission and Reception Apparatus Configuration Number)

FIG. 30 is a schematic diagram illustrating an example of the transmission and the reception apparatus configuration number information according to the fourth embodiment. FIG. 30 shows the transmission and the reception apparatus configuration number information in the case where the LTE-A mobile station category is as shown in FIG. 19.

In FIG. 30, the transmission and the reception apparatus configuration number information includes items of: the transmission and the reception apparatus configuration numbers (UE TRXh, h=1, 2, . . . , H); the number of data streams (Number of DATA streams); and the number of local CCs (Number of CC). The transmission and the reception apparatus configuration number identification information is identification information that identifies a combination of the number of data streams and the number of CCs with respect to an LTE-A mobile station category.

For example, the transmission and the reception apparatus configuration number "1" (UE_TRX1) indicates the combination of the number of data streams "8" and the number of local CCs "3."

(Regarding Configuration of Mobile Station Apparatus A4)

Figure 31:
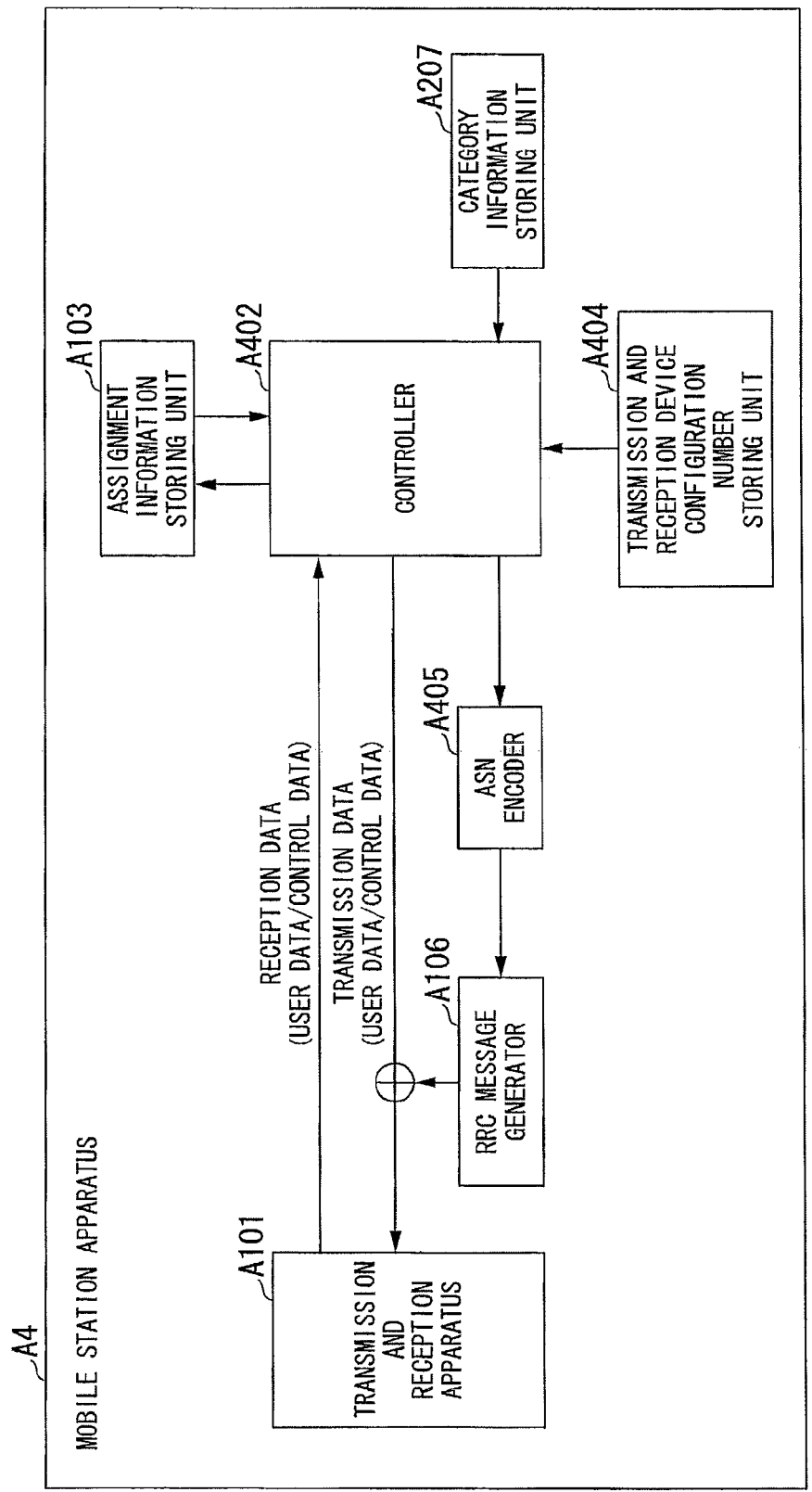
FIG. 31 is a schematic block diagram illustrating a configuration of a mobile station apparatus according to the fourth embodiment.
Figure 34:
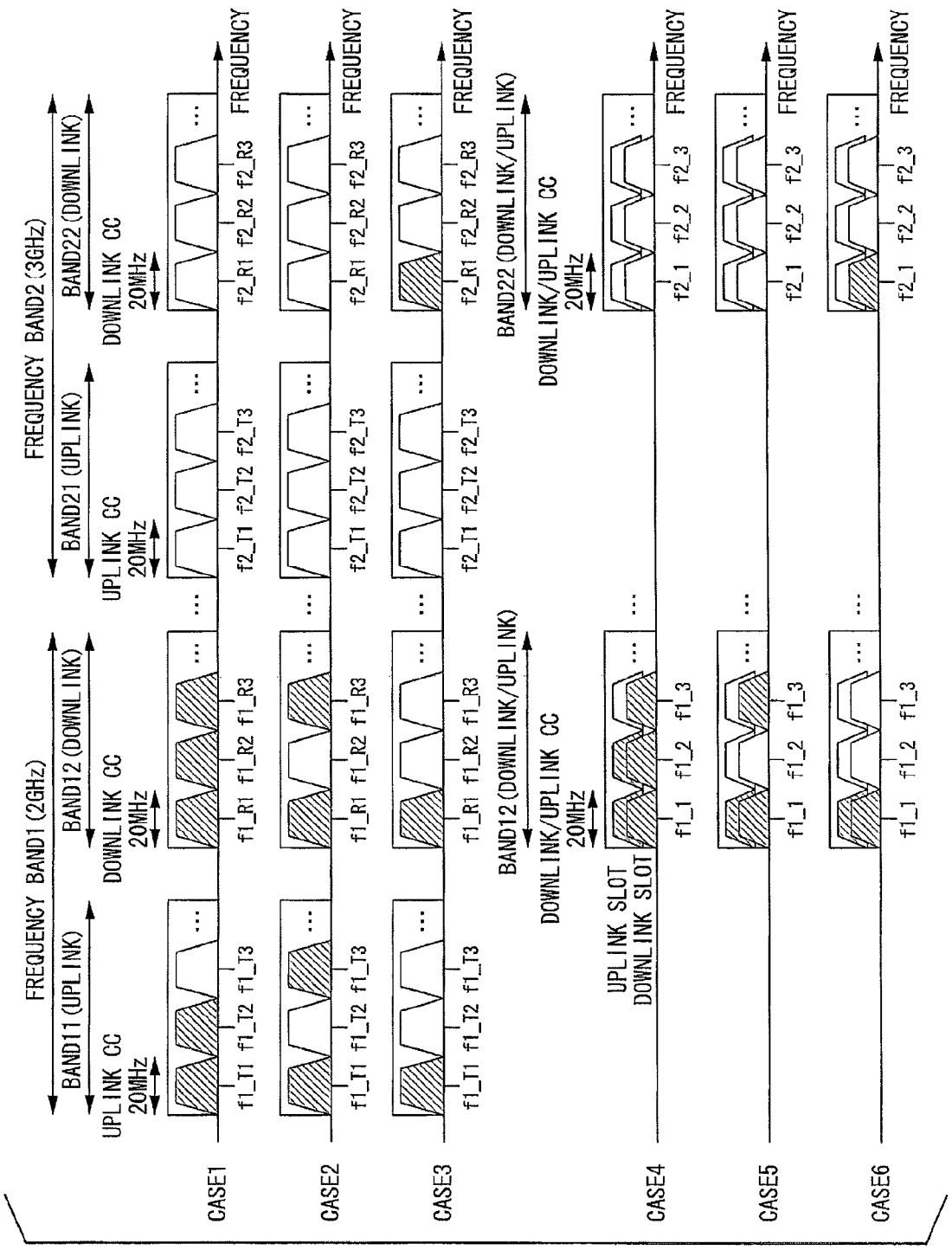
FIG. 34 is a schematic diagram illustrating an aggregation of CCs according to related art.

FIG. 31 is a schematic block diagram illustrating a configuration of the mobile station apparatus A4 according to the fourth embodiment. If the mobile station apparatus A4 according to the fourth embodiment (FIG. 31) is compared to the mobile station apparatus A3 according to the first embodiment (FIG. 26), a controller A402, an ASN encoder A405, and a transmission and reception apparatus configuration number storing unit A404 differ. However, other constituent elements (the transmission and reception apparatus A101, the assignment information storing unit A103, the RRC message generator A106, and the category information storing unit A207) have the same functions as those of the third embodiment. Explanations of the same functions as those of the third embodiment are omitted here.

The transmission and reception apparatus configuration number storing unit A404 stores the transmission and reception apparatus configuration number of the mobile station apparatus A4.

The controller A402 controls each unit of the mobile station apparatus A4. For example, the controller A402 receives radio resource information assigned by the base station apparatus B, and stores the received radio resource information in the assignment information storing unit A103. The controller A402 reads the radio resource information from the assignment information storing unit A103, and controls transmission and reception.

The transmission and reception apparatus configuration number storing unit A404 stores the transmission and reception apparatus configuration number in a memory. The transmission and reception apparatus configuration number can be previously set at the time of factory shipment according to a mobile station apparatus configuration, and be written to the transmission and reception apparatus configuration number storing unit A404.

Additionally, the controller A402 outputs, to the ASN encoder A405, the transmission and reception apparatus configuration number stored in the transmission and reception apparatus configuration number storing unit A404, and the LTE-A mobile station category information stored in the category information storing unit A207.

The ASN encoder A405 converts the transmission and reception apparatus configuration number and the LTE-A mobile station category information which are received from the controller A402 into abstract syntax notation 1 (ASN. 1) to perform encoding, and outputs the encoded information to the RRC message generator A106. The details of the process performed by the RRC message generator A106 will be explained later with the RRC message generation process. The transmission and reception apparatus A101 processes, by the RF transmission branch j, the RRC message received from the RRC message generator A106, and transmits the processed RRC message to the base station apparatus B.

Additionally, the assignment information storing unit A103, the transmission and reception apparatus configuration number storing unit A404, the RRC message generator A106, the controller A402, the ASN encoder A405, and the category information storing unit A207 may be included in an integrated circuit chip. Alternatively, part of these units may be included in the transmission and reception apparatus A101, or all of these units may be included in an integrated circuit chip. Thus, the configuration is not limited.

(Regarding RRC Message Generation Process)

Hereinafter, the RRC message generation process performed by the ASN encoder A405 and the RRC message generator A106 is explained.

FIG. 32 is a schematic diagram illustrating an example of the LTE-A mobile station communication capability message (UE-Advanced EUTRAN-Capability) according to the fourth embodiment. In FIG. 32, the LTE-A mobile station communication capability message (UE-Advanced EUTRAN-Capability shown in FIG. 32) includes mobile station category information (ue-Category) and the abbreviated transmission and reception apparatus configuration information (ue-nrf-capability).

In FIG. 32, values "1" to "6" (INTEGER (1 . . . 6)) of the mobile station category information (ue-Category) indicate the LTE-A mobile station categories A to F (see FIGS. 19 to 21), respectively.

Additionally, in FIG. 32, the reception apparatus configuration number (ue-nrx-capability) and the transmission apparatus configuration number (ue-nrx-capability) are substituted in the abbreviated transmission and reception apparatus configuration information (UE-NRF-Capability). Here, the reception apparatus configuration number and the transmission apparatus configuration number are transmission and reception apparatus configuration numbers indicating combinations of the number of data streams and the number of local CCs which can be received by a reception branch and transmitted by a transmission branch, respectively, as shown in FIG. 30.

Modified Example

FIG. 33 is a schematic diagram illustrating another example of the LTE-A mobile station communication capability message converted into the abstract syntax notation 1 according to a modified example of the fourth embodiment. In FIG. 33, among the values "1" to "11" (INTEGER (1 . . . 11)) of the mobile station apparatus category information (ue-Category shown in FIG. 25) included in the LTE mobile station communication capability message (UE-EUTRAN-Capability) of the related art, the values of "1" to "5" indicate the LTE mobile station categories 1 to 5 of the related art. The values "6" to "11" respectively indicating the LTE-A mobile station categories A to F as well as the abbreviated transmission and reception apparatus configuration information (UE-NRF-Capability shown in FIG. 32) are added thereto, thereby expressing the LTE-A mobile station communication capability message.

Regarding the base station apparatus B, the controller B102 assigns uplink/downlink radio resources based on the mobile station category information and the abbreviated transmission and reception apparatus configuration information as shown in FIGS. 19 to 21 (see FIG. 15). For example, the controller B102 decodes the LTE-A mobile station communication message (UE-Advanced EUTRAN-Capability shown in FIG. 32) or the LTE mobile station communication capability message (UE-EUTRAN-Capability shown in FIG. 33) from the RRC message received from the mobile station apparatus A4 to extract the mobile station category information (ue-Category) and the abbreviated transmission and reception apparatus configuration information (UE-NRF-Capability). Based on the mobile station category information and the abbreviated transmission and reception apparatus configuration information which are extracted, the controller B402 determines assignment of uplink/downlink radio resources to the mobile station apparatus A4.

For example, the controller B102 extracts the LTE-A mobile station category B from the mobile station category information, and extracts the reception apparatus configuration number (ue-nrx-capability) "11" and the transmission apparatus con figuration number (ue-nrx-capability) "11" from the abbreviated transmission and reception apparatus configuration information. The buffer size of uplink/downlink data processing software of the mobile station apparatus A4 (the maximum downlink data speed 100 Mbps, the maximum uplink data speed 75 Mbps) can be determined by the LTE-A mobile station apparatus category B. Additionally, it can be determined by the reception apparatus configuration number "11," the transmission apparatus configuration number "11," and the frequency band 1 (FIG. 2, 2 GHz, the frequency band number 1) received through another RRC message that the mobile station apparatus A4 has such a configuration that two BB demodulation branches (BB_DM1, BB_DM2) are included in one RF reception branch (RX1) with respect to the frequency band 1 (FIG. 2, 2 GHz, the frequency band number 1), and that one BB modulation branch (BB_MDl) is included in one RF transmission branch 1 (TX1).

If the base station apparatus B has such communication capability as can achieve the compatibility with the LTE-A mobile station category C, that is, such communication capability that the base station apparatus B can perform, in the frequency band 1 (FIG. 2, 2 GHz, the frequency band number 1), transmission of f1_R1 to f1_R4 of the downlink local CCs and reception of f1_T1 to f1_T4 of the uplink local CCs, the controller B102 assigns uplink/downlink local CCs to the mobile station apparatus A4, and reports the assignment at the time of the initial access by the mobile station apparatus A4. For the downlink, since the mobile station apparatus A4 has such a configuration that two demodulation branches are included in one RF reception branch with respect to the frequency band 1, the controller B102 assigns to the mobile station apparatus A4, for example, f1_R1 and f1_R2 of continuous downlink local CCs, or f1_R1 and f1_R4 of non-continuous downlink local CCs, in consideration of user load in the downlink, that is, the load balance of f1_R1 to f1_R4 of the downlink local CCs. For the uplink, since the mobile station apparatus A4 has such a configuration that one BB demodulation branch is included in one RF transmission branch with respect to the frequency band 1, the controller B102 assigns, for example, f1_R2 of the uplink local CC to the mobile station apparatus A4 in consideration of user load in the uplink, that is, the load balance of f1_T1 to f1_T4 of the uplink local CCs (if there is compatibility with multiple uplink local CCs, continuous/non-continuous CCs can be assigned similarly to the downlink).

For example, in the case of continuous downlink local CCs, the controller B402 assigns to the downlink local CCs having the frequencies f1_R1 and f1_R2, downlink radio resources, that are, downlink resource blocks RBs for the mobile station apparatus A4 to receive mobile station apparatus data. Further, the controller B402 assigns to the uplink local CC having the frequency f1_T2, uplink radio resources, that are, uplink resource blocks RBs for the mobile station apparatus A4 to transmit mobile station apparatus data. The controller B102 compares the mobile station apparatus category information and the transmission and reception apparatus configuration information from the mobile station apparatus A4 to the transmission and reception apparatus configuration information of the base station apparatus B, and thereby can assign adequate downlink/uplink radio resources to the mobile station device A4 within the communication capabilities of the base station apparatus and the mobile station apparatus.

The controller B102 stores, in the assignment information storing unit B103, assignment information of the uplink/downlink local CC, and assignment information of the radio resource assigned to the uplink/downlink local CC. The controller B102 reads, from the assignment information storing unit B103, the assignment information of the uplink/downlink local CC, and the assignment information of the radio resource assigned to the uplink/downlink local CC, and thereby controls transmission and reception. Additionally, the controller B102 transmits, to the mobile station apparatus A4 through the transmission and reception apparatus B101, the assignment information of the determined uplink/downlink local CC, and the assignment information of the radio resource assigned to uplink/downlink local CC.

As explained above, according to the fourth embodiment, the mobile station apparatus A4 transmits, to the base station apparatus B, the LTE-A mobile station category information and the transmission and reception apparatus configuration information which can be used for communication with the base station apparatus B. Additionally, the mobile station apparatus A4 communicates with the base station apparatus B using the uplink/downlink radio resources assigned by the base station apparatus B based on the LTE-A mobile station category information and the transmission and reception apparatus configuration information. Thereby, the communication system of the fourth embodiment can assign uplink/downlink radio resources adequate for communication between the mobile station apparatus A4 and the base station apparatus B.

In contract to the third embodiment where the limited transmission and reception apparatus configuration information which is limited to the LTE-A mobile station category information is added, in the fourth embodiment, the limited abbreviated transmission and reception apparatus configuration information which is limited to the LTE-A mobile category information is added thereto, thereby relaxing the limitation to various LTE-A technical elements such as the above (a) to (l) compared to the third embodiment. Further, the information amount of the RRC message including information of the LTE-A mobile station categories A to F (see FIGS. 19 to 21) and the abbreviated transmission and reception apparatus configuration information (such as the number of bits, the information amount of uplink signaling control signals, or overhead of radio resources) is smaller than in the third embodiment.

A computer may implement part of the mobile station apparatuses A1, A2, A3, and A4 and the base station apparatus B, such as: the controllers A102, A202, A302, and A402; the ASN encoders A105, A205, A305, and A405; the category information storing unit A207; and the controller B102. In this case, a computer-readable recording medium may store a program for implementing these control functions, so that a computer system reads and executes the program stored in the recording medium and thereby implement the control functions. Here, the "computer system" is a computer system included in the mobile station apparatuses A1, A2, A3, and A4, or the base station apparatus B, and includes OS and hardware, such as a peripheral apparatus. Additionally, the "computer-readable recording medium" includes a portable medium such as a flexible disc, a magneto-optical disc, a ROM, and a CD-ROM, and a storage apparatus such as a hard disk built in the computer system. Further, the "computer-readable recording medium" may include a medium that dynamically stores a program for a short period of time, such as a communication line used when a program is transmitted via a network such as the Internet or a communication line such as a telephone line. Additionally, the "computer-readable recording medium" may include a medium that stores a program for a predetermined period of time, such as a volatile memory built in a computer system serving as a server or client when the program is transmitted via a network such as the Internet or a communication line such as a telephone line. Moreover, the program may be a program for implementing part of the aforementioned functions. Further, the program may be a program that can implement the aforementioned functions in combination with a program already recorded in the computer system.

Additionally, part or all of the mobile station apparatuses and base station apparatus according to the aforementioned embodiments may be implemented typically by an LSI that is an integrated circuit. Each of the functional blocks of the mobile station apparatuses and the base station apparatus may be individually made into a chip. Alternatively, part or all of the functional blocks may be integrated and made into a chip. Further, a method of forming the integrated circuit is not limited to the LSI, and the integrated circuit may be implemented by a dedicated circuit or a general-purpose processor. Moreover, if technology of forming an integrated circuit to be substituted with the LSI is developed along with the progress of semiconductor technology, an integrated circuit formed by that technology may be used.

Although the embodiments of the present invention have been explained with reference to the drawings, specific configurations are not limited thereto. Various design modifications may be made without departing from the scope of the present invention.

INDUSTRIAL APPLICABILITY

The present invention is suitable to be used for a mobile station apparatus and a wireless communication system for mobile communication, and similar technology, and enables assignment of radio resources adequate for communication between the mobile station apparatus and a base station apparatus.

DESCRIPTION OF REFERENCE SYMBOLS

A12, A11, A1, A2, A3, and A4: mobile station apparatus
B: base station
a1: transmission and reception apparatus
a101, a201, and a301-i: transmission and reception common antenna
a102, a202, and a302-i: antenna duplexer
a11, a21, and a31-i: radio receiver
a12, a22-l, and a32-il: quadrature demodulator
a13, a23-l, and a33-il: baseband demodulator
a14, a24-k, and a34-jk: baseband modulator
a15, a25-k, and a35-jk: quadrature modulator
a16, a26, and a36-j: radio transmitter
A102, A202, A302, and A402a: controller
A103: assignment information storing unit
A104: transmission and reception apparatus configuration information storing unit
A105, A205, A305, and A405: ASN encoder
A106: RRC message generator
B101: transmission and reception apparatus
B102: controller
B103: assignment information storing unit
A207: category information storing unit

The invention claimed is:

1. A mobile station apparatus comprising:
a radio resource control message generator configured to include mobile station apparatus capability information in a radio resource control message; and
a transmitter configured to transmit the radio resource control message including the mobile station apparatus capability information to a base station apparatus, wherein
the mobile station apparatus capability information includes a first indicator which is selected from a plurality of indicators and a second indicator which is selected from the plurality of indicators,
each of the plurality of indicators defines at least a combination of first information associated with an aggregated frequency bandwidth of one or more component carriers and second information associated with the number of component carriers included in the aggregated frequency bandwidth of the one or more component carriers, the first indicator is used for uplink, and the second indicator is used for downlink.

2. The mobile station apparatus according to claim 1, wherein the indicators respectively associated with uplink frequency bands and downlink frequency bands have a hierarchical structure.

3. The mobile station apparatus according to claim 1, wherein the mobile station apparatus capability information further includes multiple-input multiple-output (MIMO) capability information.

4. A communication control method for a mobile station apparatus, the communication control method comprising:

including mobile station apparatus capability information in a radio resource control message; and transmitting the radio resource control message including the mobile station apparatus capability information to a base station apparatus, wherein the mobile station apparatus capability information includes a first indicator which is selected from a plurality of indicators and a second indicator which is selected from the plurality of indicators, each of the plurality of indicators defines at least a combination of first information associated with an aggregated frequency bandwidth of one or more component carriers and second information associated with the number of component carriers included in the aggregated frequency bandwidth of the one or more component carriers, the first indicator is used for uplink, and the second indicator is used for downlink.

5. The communication control method according to claim 4, wherein the indicators respectively associated with uplink frequency bands and downlink frequency bands have a hierarchical structure.

6. The mobile station apparatus according to claim 3, wherein the MIMO capability information includes information indicating the number of layers.

7. The mobile station apparatus according to claim 3, wherein the MIMO capability information includes information indicating the number of MIMO streams.

8. The mobile station apparatus according to claim 3, wherein the MIMO capability information includes information indicating a plurality of numbers, each number indicating the number of layers.

9. The mobile station apparatus according to claim 8, wherein the plurality of numbers are 2 and 4.

10. The mobile station apparatus according to claim 8, wherein the plurality of numbers are 2, 4, and 8.

11. The mobile station apparatus according to claim 3, wherein the MIMO capability information includes a number indicating the number of data streams.

12. The mobile station apparatus according to claim 3, wherein the MIMO capability information includes a number indicating the number of antennas.

13. A base station apparatus comprising:

a receiver configured to receive from a mobile station apparatus, a radio resource control message including mobile station apparatus capability information; and a controller configured to allocate to the mobile station apparatus, one or a plurality of component carriers to be used for communication, based on mobile station apparatus capability information, wherein the mobile station apparatus capability information includes a first indicator which is selected from a plurality of indicators and a second indicator which is selected from the plurality of indicators, each of the plurality of indicators defines at least a combination of first information associated with an aggregated frequency bandwidth of one or more component carriers and second information associated with the number of component carriers included in the aggregated frequency bandwidth of the one or more component carriers, the first indicator is used for uplink, and the second indicator is used for downlink.

14. The base station apparatus according to claim 13, wherein the indicators respectively associated with uplink frequency bands and downlink frequency bands have a hierarchical structure.

\* \* \* \* \*